United States Patent
McGuire et al.

(10) Patent No.: US 11,655,900 B2
(45) Date of Patent: *May 23, 2023

(54) VALVE WITH PRESSURE DIFFERENTIAL SEATING

(71) Applicant: OIL STATES ENERGY SERVICES, L.L.C., Houston, TX (US)

(72) Inventors: Bob McGuire, Meridian, OK (US); Danny L. Artherholt, Asher, OK (US); Mickey Claxton, Oklahoma City, OK (US); Blake Mullins, Edmond, OK (US)

(73) Assignee: Oil States Energy Services, L.L.C., Houston, TX (US)

( * ) Notice: Subject to any disclaimer, the term of this patent is extended or adjusted under 35 U.S.C. 154(b) by 31 days.

This patent is subject to a terminal disclaimer.

(21) Appl. No.: 16/988,283

(22) Filed: Aug. 7, 2020

(65) Prior Publication Data

US 2020/0370658 A1   Nov. 26, 2020

Related U.S. Application Data

(63) Continuation-in-part of application No. 16/663,077, filed on Oct. 24, 2019, now Pat. No. 11,028,929.

(Continued)

(51) Int. Cl.
*F16K 3/02* (2006.01)
*F16K 5/06* (2006.01)
(Continued)

(52) U.S. Cl.
CPC ............ *F16K 3/0236* (2013.01); *F16K 3/207* (2013.01); *F16K 5/0471* (2013.01);
(Continued)

(58) Field of Classification Search
CPC ...... F16K 3/0236; F16K 3/0272; F16K 3/207; F16K 3/20; F16K 27/044; F16K 5/0678;
(Continued)

(56) References Cited

U.S. PATENT DOCUMENTS 3,235,224 A * 2/1966 Grove ................... F16K 5/0673
251/327
3,446,476 A * 5/1969 Scaramucci .......... F16K 5/0673
251/328

(Continued)

FOREIGN PATENT DOCUMENTS

DE          2746609 A1 * 10/1977
WO      WO-9825057 A2 *  6/1998 ............. F16K 3/207

OTHER PUBLICATIONS

Patent Cooperation Treaty, PCT/US2020/045469, International Search Report and Written Opinion, dated Oct. 21, 2020.‡

(Continued)

*Primary Examiner* — David Colon-Morales
(74) *Attorney, Agent, or Firm* — Morgan, Lewis & Bockius, LLP

(57) ABSTRACT

A valve for use in oil and gas production or similar applications includes a plug or other flow barrier disposed in a cavity of a hollow valve body with a metal-to-metal sealing surface that is not reliant on any rubberized or elastomeric material to effect a seal.

9 Claims, 29 Drawing Sheets

Related U.S. Application Data

(60) Provisional application No. 62/754,081, filed on Nov. 1, 2018.

(51) Int. Cl.
   *F16K 3/20* (2006.01)
   *F16K 5/18* (2006.01)
   *F16K 5/20* (2006.01)
   *F16K 5/04* (2006.01)

(52) U.S. Cl.
   CPC ............ *F16K 5/0689* (2013.01); *F16K 5/188* (2013.01); *F16K 5/205* (2013.01)

(58) Field of Classification Search
   CPC ...... F16K 5/0673; F16K 5/0471; F16K 5/205; F16K 5/188; F16K 5/201; F16K 5/181; F16K 27/067; F16K 27/065
   See application file for complete search history.

(56) References Cited

U.S. PATENT DOCUMENTS

| | | | | |
|---|---|---|---|---|
| 3,521,855 | A * | 7/1970 | Jensen | F16K 5/0673 251/315.08 |
| 3,610,569 | A * | 10/1971 | Reaves | F16K 31/1225 251/52 |
| 3,722,855 | A * | 3/1973 | Massey | F16K 27/067 251/367 |
| 3,749,357 | A * | 7/1973 | Fowler | F16K 5/205 251/315.08 |
| 3,890,991 | A * | 6/1975 | Grove | F16K 31/52433 137/1 |
| 4,020,864 | A * | 5/1977 | Church, Jr. | F16K 5/201 251/174 |
| 4,059,250 | A * | 11/1977 | Guldener | F16K 27/067 277/377 |
| 4,111,393 | A | 9/1978 | McClurg et al. | |
| 4,124,194 | A * | 11/1978 | Alvarez | F16K 3/186 251/328 |
| 4,155,536 | A * | 5/1979 | Saiki | F16K 5/0673 251/332 |
| 4,177,833 | A * | 12/1979 | Morrison | F16K 5/0673 137/625.12 |
| 4,226,258 | A * | 10/1980 | Nakanishi | F16K 31/163 137/246.22 |
| 4,331,172 | A * | 5/1982 | D'Angelo | F16K 5/0673 137/72 |
| 4,440,381 | A * | 4/1984 | Tipton, Jr. | F16K 27/044 251/327 |
| 4,513,947 | A * | 4/1985 | Amend | F16K 3/20 251/328 |
| 4,684,105 | A * | 8/1987 | Haas, II | F16K 5/201 251/150 |
| 4,878,651 | A * | 11/1989 | Meyer, Jr. | F16K 3/0236 251/328 |
| 4,923,171 | A * | 5/1990 | Beson | F16K 5/201 251/167 |
| 5,201,872 | A * | 4/1993 | Dyer | F16K 3/0236 251/328 |
| 5,360,036 | A | 11/1994 | Kieper | |
| 5,445,359 | A * | 8/1995 | Beson | F16K 3/207 251/167 |
| 5,533,738 | A * | 7/1996 | Hoffmann | F16K 5/201 251/174 |
| 5,624,101 | A * | 4/1997 | Beson | F16K 3/20 251/174 |
| 5,707,042 | A * | 1/1998 | Maselli | F16K 5/0673 251/315.12 |
| 5,927,684 | A * | 7/1999 | Marx | F16K 3/20 277/618 |
| 6,082,707 | A * | 7/2000 | Hosie | F16K 5/205 251/181 |
| 6,206,023 | B1 * | 3/2001 | Landers | F16K 5/0673 137/15.18 |
| 6,279,875 | B1 * | 8/2001 | Chatufale | F16K 3/207 251/328 |
| 6,345,805 | B1 * | 2/2002 | Chatufale | F16K 5/0471 251/309 |
| 6,664,572 | B2 * | 12/2003 | Chatufale | F16K 3/0227 251/329 |
| 6,938,876 | B2 * | 9/2005 | Kapczynski | F16K 43/00 251/315.12 |
| 6,966,537 | B2 * | 11/2005 | Sundararajan | F16K 3/0227 251/175 |
| 7,225,827 | B2 * | 6/2007 | Maichel | F16L 55/105 251/327 |
| 8,091,861 | B2 * | 1/2012 | Nesje | F16K 25/00 251/282 |
| 8,327,866 | B2 * | 12/2012 | Parks, Jr. | F16K 3/0236 251/328 |
| 8,496,226 | B2 * | 7/2013 | Dalluge | F16K 5/0636 251/315.1 |
| 8,672,295 | B2 * | 3/2014 | Dhawan | F16K 3/20 251/328 |
| 8,733,733 | B2 * | 5/2014 | Collison | F16K 5/0636 251/315.12 |
| 8,973,897 | B2 * | 3/2015 | Cordova | F16K 3/02 251/327 |
| 9,453,578 | B2 * | 9/2016 | Sundararajan | F16K 3/0236 |
| 9,885,420 | B2 * | 2/2018 | Sundararajan | F16K 3/0227 |
| 9,915,359 | B2 * | 3/2018 | Ricard | F16K 5/0673 |
| 10,422,197 | B2 * | 9/2019 | Herland | F16K 3/02 |
| 10,969,023 | B2 * | 4/2021 | Mcguire | F16K 5/201 |
| 11,028,929 | B2 * | 6/2021 | McGuire | F16K 3/0236 |
| 11,199,270 | B1 * | 12/2021 | Valera | F16K 3/20 |
| 2006/0017035 | A1 * | 1/2006 | Bearer | F16K 5/0678 251/174 |
| 2016/0186870 | A1 * | 6/2016 | Ricard | F16K 5/0678 251/315.01 |
| 2019/0249782 | A1 * | 8/2019 | Bell | F16K 5/0605 |
| 2020/0232564 | A1 * | 7/2020 | Karlsen | F16K 5/201 |
| 2020/0370658 | A1 * | 11/2020 | McGuire | F16K 5/0471 |
| 2020/0408310 | A1 * | 12/2020 | McGuire | F16K 25/00 |

OTHER PUBLICATIONS

PCT/US2019/057924; Jan. 6, 2020, International Search Report and Written Opinion.‡

\* cited by examiner
‡ imported from a related application

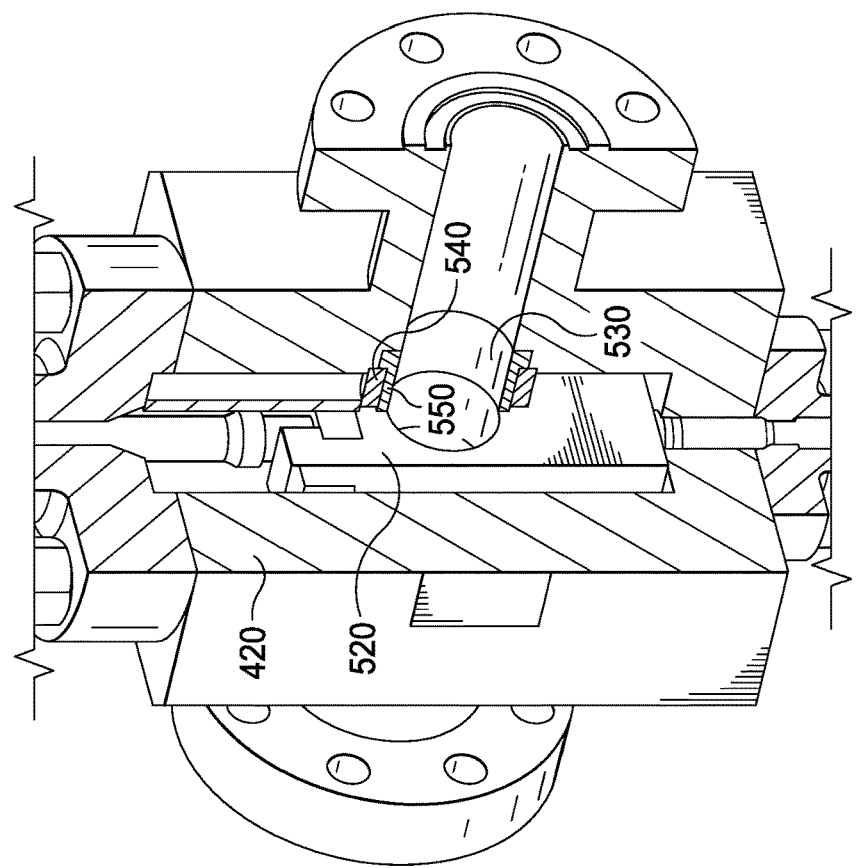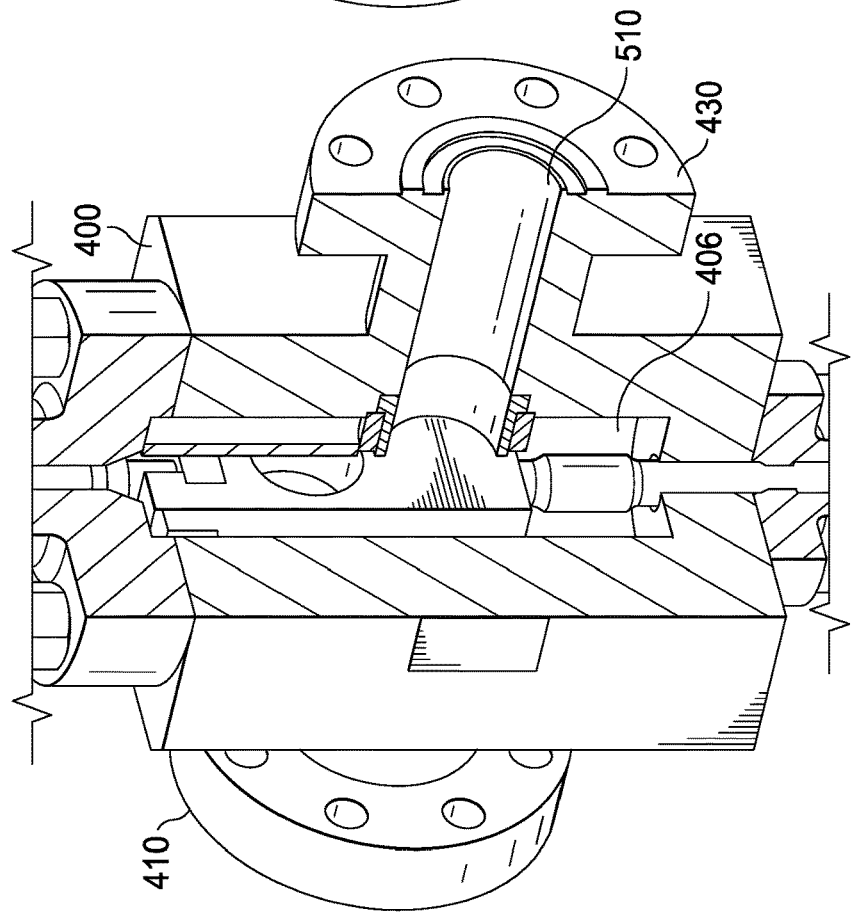
FIG. 6

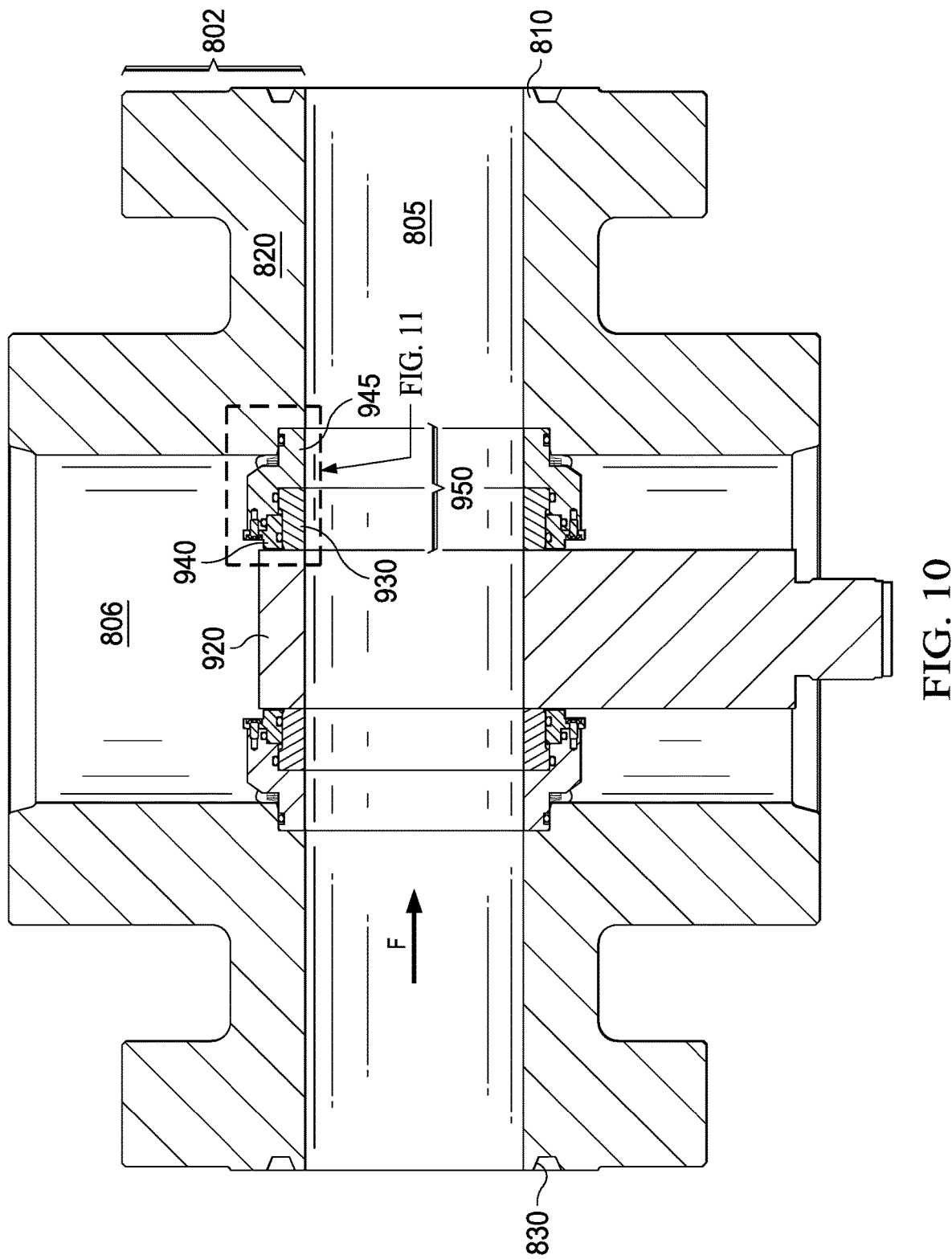

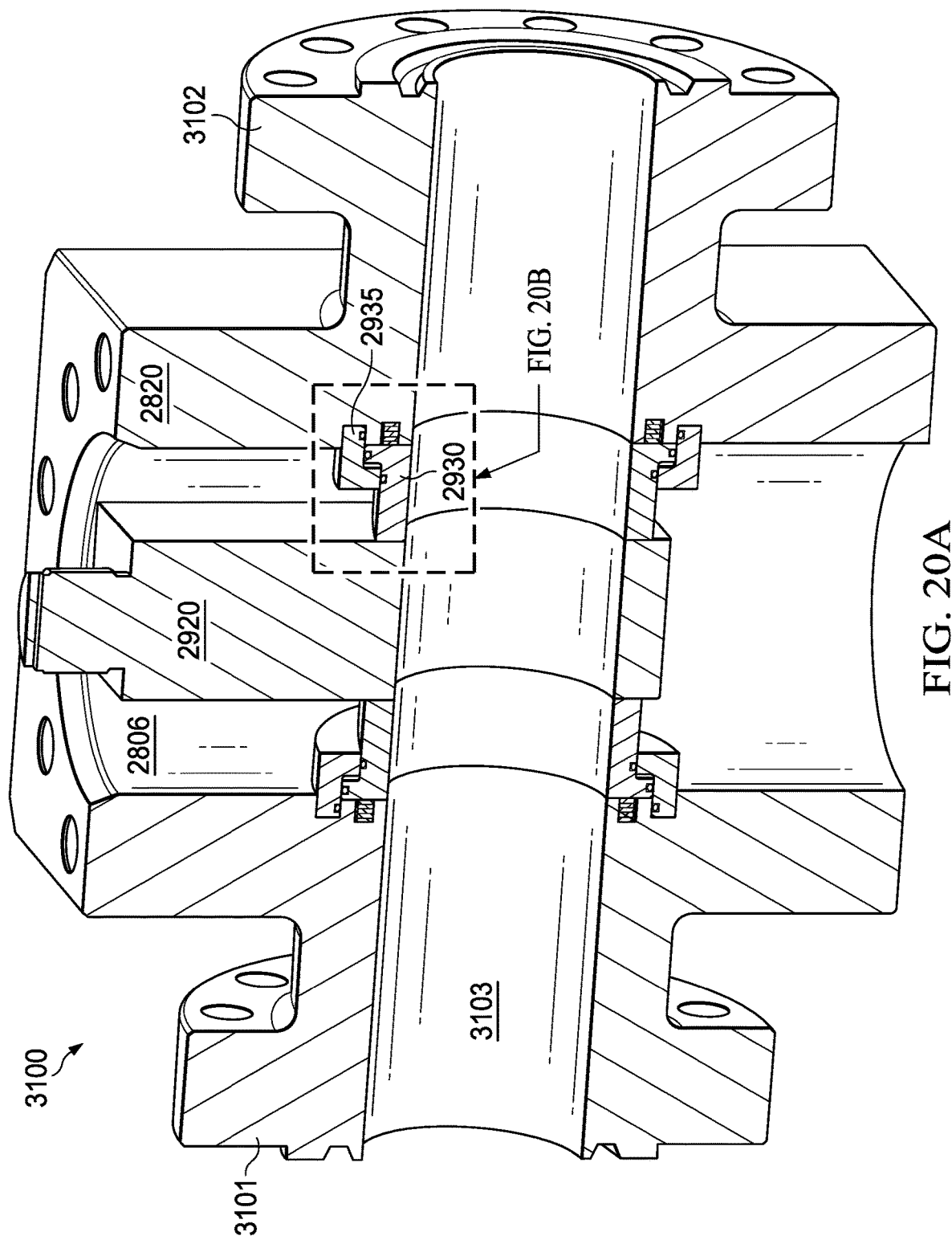

VALVE WITH PRESSURE DIFFERENTIAL SEATING

FIELD OF THE INVENTION

The invention relates to an improved design for a valve that uses asymmetric pressure applied to a bushing and sealing mechanism to allow for improved sealing performance and reduced maintenance requirements. Although the valve is primarily described in reference to a plug valve, it could be equally applicable to other types of valves, including but not limited to a ball valve or gate valve.

BACKGROUND OF THE INVENTION

Valves generally comprise a valve body with an interior bore for the passage of fluid, and a means of sealing off the interior bore to stop the flow of fluid. Certain types of valves, such as plug valves or ball valves, include a plug or ball that is capable of rotating between an open position, in which fluid is allowed to flow through the interior bore, and a closed position, in which the plug or ball blocks the flow of fluid through the interior bore. Other types of valves, such as gate valves, include a gate that is vertically lowered to block the flow of fluid through the interior bore. All of these types of valves are often used in connection with the production of hydrocarbons such as crude oil or natural gas.

The valve of the present invention will be primarily described in the context of an embodiment using a plug valve, but it could also be used in ball valves, gate valves, or other types of valves. In some applications, it might be preferable to use a ball valve, rather than a plug valve, which allows for more even distribution of the contact pressure around the seat. In any event, the particular type of valve is not critical to the operation of the invention and the claims of the present application should not be interpreted as limited to any specific type of flow barrier used in the valve. It will be readily apparent to one of ordinary skill in the art how to implement the present invention in a type of valve other than a plug valve.

Plug valves require a sealing interface so that, when in the closed position, the plug will contain the pressure of the fluid within the interior bore of the valve. In many applications, such as the production of hydrocarbons, interior pressures can be extremely high, on the order of 15,000 pounds per square inch or higher. In addition, the fluid within the interior bore may be corrosive or otherwise potentially damaging to the seals. Accordingly, the integrity and reliability of the sealing interface is of utmost importance in the design of a plug valve.

One of the primary failure modes of most valves is damaged sealing surfaces. One of the reasons for this is the common use of elastomeric or rubberized seals in hazardous environments like those encountered in the production of hydrocarbons such as crude oil or natural gas. The use of elastomers or rubberized components can create increased risks for degradation and failure within the valve and create increased maintenance costs due to the location of the damaged seals or valve components and lead to production down time.

Another problem with existing plug valve designs is that they traditionally seal only on one side of the valve, generally the downstream side, when considering the typical direction of the fluid flow through the valve. This design is prone to failure from contamination of the sealing surfaces because the sealing surfaces are only engaged when the valve is closed. When the valve is open, there is a gap between the sealing surfaces. The lack of constant engagement allows chemicals and/or particulates in the fluid stream to degrade the sealing surfaces to the point that they no longer effectuate a seal. For example, sand or other particulate matter may cause abrasion of the sealing surface, particularly if the seal is formed from an elastomeric material. Separate from the risk of abrasion, particulate matter such as sand may remain in the gap between sealing surfaces when an operator is attempting to open or close the valve and may physically interfere with the formation of a solid seal and/or may increase the difficulty of rotating the valve to or from an open or closed position.

The gap between sealing surfaces in a typical plug valve is also problematic because valves generally require grease to function; without grease or some other lubricant in the valve body, the plug or ball cannot rotate to a closed position. A gap between sealing surfaces typically allows grease to move from the interior of the valve body to the fluid stream. This migration of grease creates a loss of lubrication which can result in the plug being unable to rotate to the open (or closed) position.

Although there are other valve designs with double seals, like that found in U.S. Pat. No. 5,624,101, those designs generally rely on double energization of the seals in order to create a double sealing mechanism and reliance on a block and bleed function to normalize pressure on the seals. This block and bleed function can lead to similar seal issues as described above.

Another problem with certain prior art plug valves is that when in the closed position, the plug and the valve body may seize under high pressures. When high working pressures exist in fluid either downstream or upstream of the plug valve, the plug cannot move from its sealed position due to the high pressure forces exerted on the valve and gets stuck in place. The likelihood of such an occurrence is higher when the valve body has lost grease, a problem already discussed above. These high pressure environments can be hazardous and create issues with maintenance of the plug valve as well as potential failure mechanisms for the plug valve itself when operated against such high pressures. At the same time, the standard design can also be prone to leaking at low pressures because the design is meant to be at a high pressure to engage the sealing surfaces when the valve is closed. The aforementioned problem with grease loss can also exacerbate the problem with leaking at low pressure, as grease often serves as the low pressure seal in existing valve designs.

For the above reasons and others, standard existing valve designs are often unreliable. The unreliability of these valves frequently prompts users to stack multiple valves together to ensure they are able to stop the flow of fluid.

The present invention addresses the unmet need for a valve that can be seated in hazardous environments, high pressure environments, with more easily replaceable parts, and/or creates a pressure differential at the seats automatically based on the geometry of the components used to provide a sealing surface against the plug.

SUMMARY OF THE INVENTION

An aspect of the present invention is to create a valve with a seat and seat bushing configuration such that the seat is maintained in sealing contact with the plug body regardless of whether the valve is in the opened or closed position.

In an exemplary embodiment, the seat and seat bushing are both located in a recess of the valve body and configured such that, when the valve is in the open position, the seat is maintained in sealing engagement with the flow barrier on both the upstream and downstream sides of the valve.

The seat is generally annular in shape with two radial surface areas. When the valve is in the open condition, the fluid in the interior bore exerts pressure on both surface areas of the seat but, due to a differential in the two surface areas, a net positive force tends to urge the seat into sealing engagement with the flow barrier. In addition, the fluid also exerts pressure on the radial surface area of the seat bushing closest to the flow barrier, tending to push the seat bushing away from the flow barrier. However, the opposite side of the seat bushing, the radial surface farthest from the flow barrier, engages with a shoulder of the valve body, rather than the seat. Accordingly, the pressure exerted on the seat bushing does not interfere with the seal between the seat and the flow barrier.

When the valve is in the closed position, a primary seal is maintained on the upstream side similar to when the valve is in the open position, while a secondary seal is also maintained on the downstream side of the valve.

In an exemplary embodiment, in addition to an improved sealing mechanism, the seat and seat bushing are formed from stainless steel or another metal, rather than the rubber or elastomeric seals generally found in prior art plug valves. This provides for increased durability, longer life between required maintenance, and a more robust metal-to-metal seal.

In an exemplary embodiment, in addition to an improved sealing mechanism, the seat bushing and seat each comprise corresponding keyed portions that allow for easy removal of the seat for maintenance purposes during down time or for inspection. Rotating the seat bushing relative to the seat can engage the keyed portions to allow the seat bushing to assist with the removal of the seat from the valve body, or can disengage the keyed portions to allow the seat bushing to be separated from the seat. This provides for reduced maintenance time and reduced cost of maintenance.

References throughout the description to "upstream" and "downstream" should not be interpreted as limiting which term could be used to refer to which particular portion of the invention. Those of skill in the art will understand that which portion of the valve is upstream or downstream depends on which direction fluid is flowing, and is therefore unrelated to the structure of the device itself.

BRIEF DESCRIPTION OF THE DRAWINGS

Specific embodiments of the invention are described below with reference to the figures accompanying this application. The scope of the invention is not limited to the figures.

FIG. 6 depicts a side view of the interior of an embodiment of the valve body for an alternative gate valve embodiment.

FIG. 10 depicts a side view of the interior of the body of an alternative embodiment of a gate valve comprising a body bushing.

FIG. 20A depicts an alternative embodiment of a gate valve in which a seat and seat bushing are partially disposed within a recess formed in the valve body and a biasing member is disposed between the valve body and the downstream surface of the seat to aid in sealing between the seat and the flow barrier under low-pressure operating conditions.

DETAILED DESCRIPTION OF THE INVENTION

Figure 1:
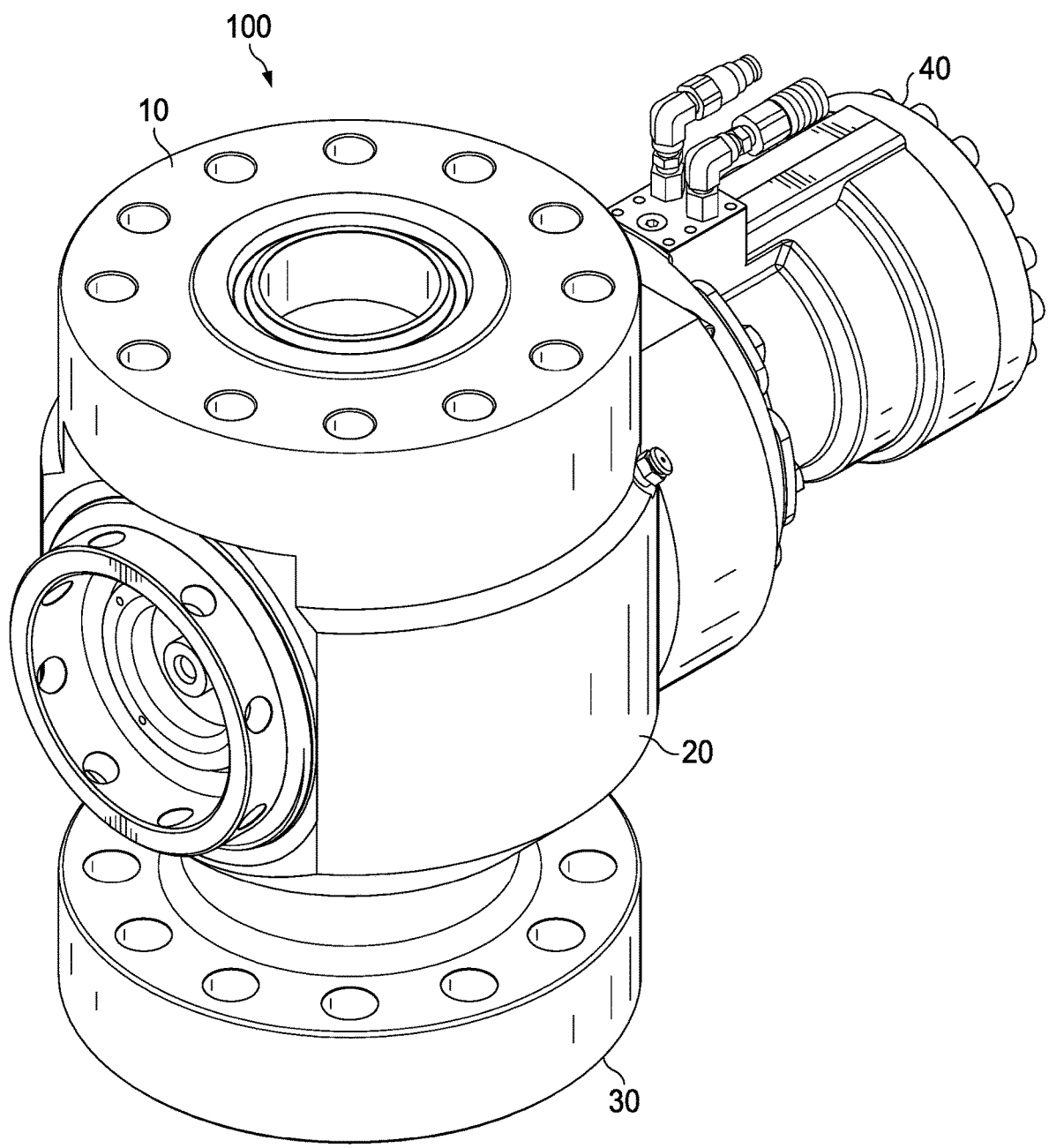
FIG. 1 depicts a perspective view of an embodiment of the plug valve when it is manufactured with flanges ready to be installed.

Referring to FIG. 1, the valve 100 includes a flanged connection to be installed in an oil and gas production area or similar application. The fluid enters into the valve at the upstream flanged connection 10 and is allowed to flow through the valve body 20 and exits the downstream flanged connection 30. The valve is operable by a valve stem that connects to the plug and is operable to rotate the plug from the open to closed position. The operation of the valve may be controlled by hydraulic actuator 40. Other types of actuators, including electronic, could also be used.

Figure 2:
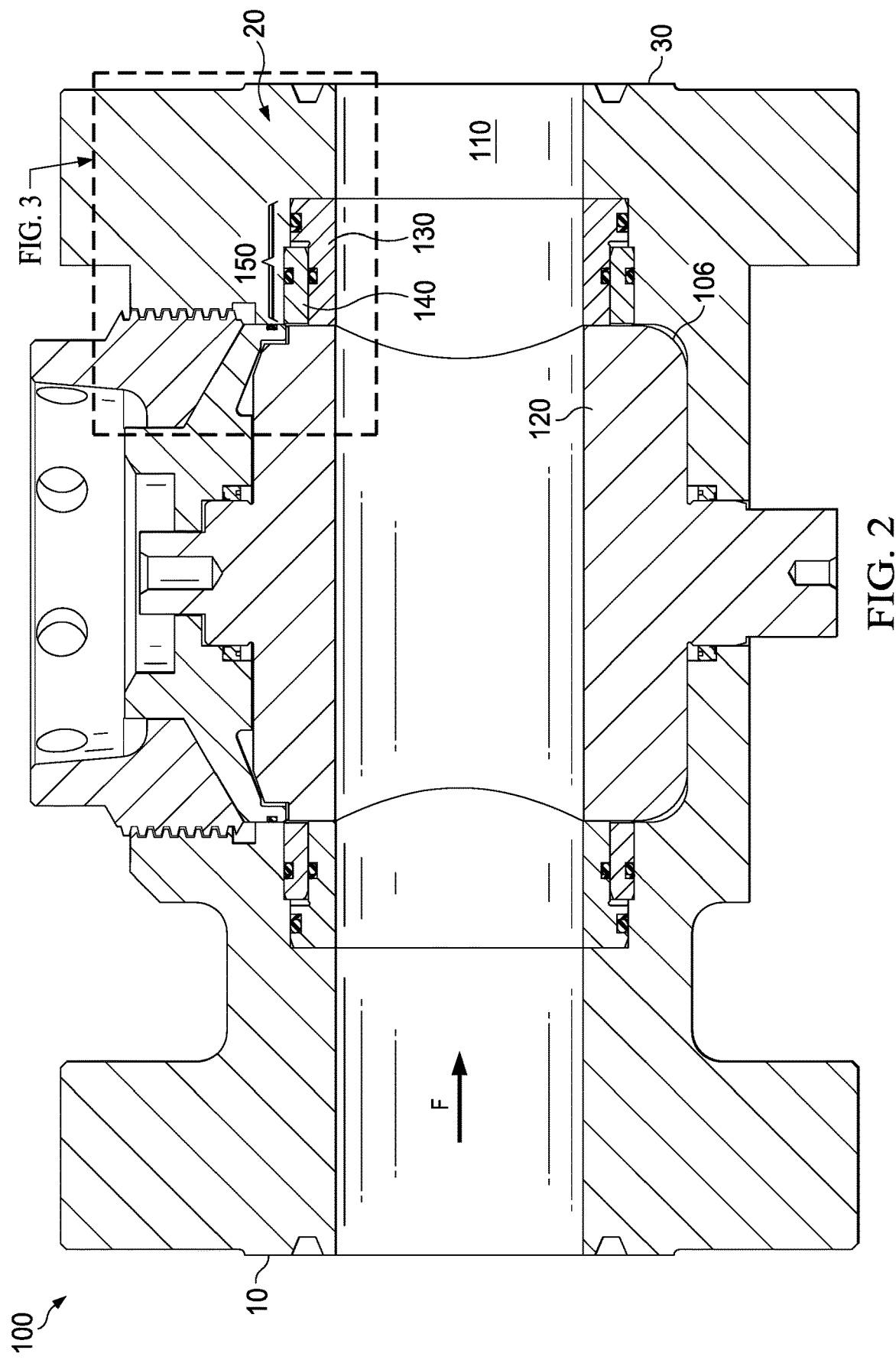
FIG. 2 depicts a side view of the interior of the embodiment shown in FIG. 1.

Referring to FIG. 2, an exemplary embodiment of the valve 100 is shown. Extending between upstream flanged connection 10 and downstream flanged connection 30 is interior bore 110.

Within valve body 20 is disposed plug 120, seat 130 and seat bushing 140. Seat 130 and seat bushing 140 are generally annular in shape and both located within recess 150 formed in the valve body. Both seat 130 and seat bushing 140 may be formed of metal, such as stainless steel. Cavity 106 is formed within valve body 20 and plug 120 rotates within cavity 106. Fluid may flow through interior bore 110 in the direction indicated by arrow F but, as noted above, fluid may also flow in the opposite direction and the valve will still function as described below.

Figure 3:
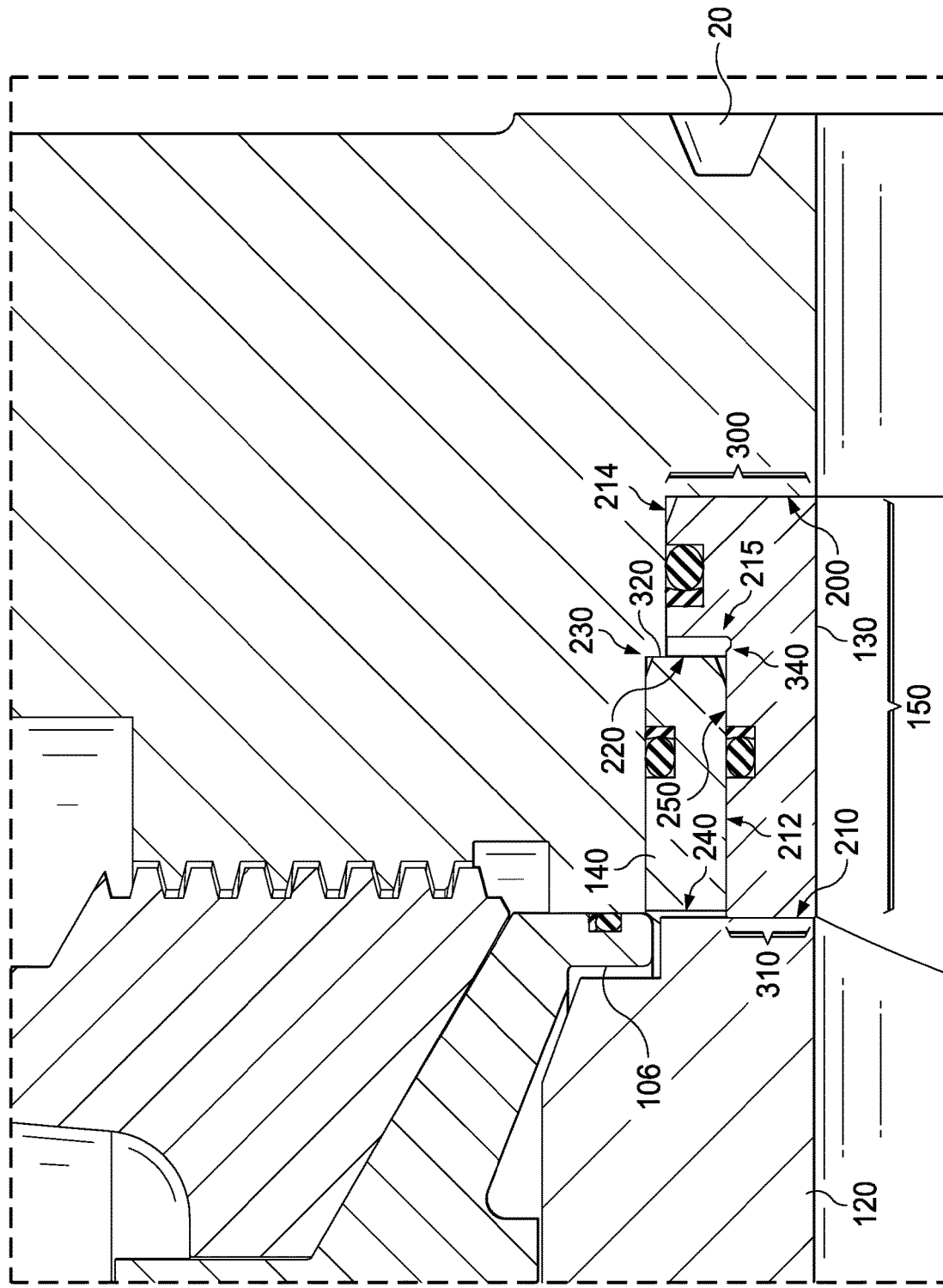
FIG. 3 depicts a close up view of the seat and seat bushing in relation to the plug and valve body when the embodiment of the valve shown in FIG. 1 is in the open position.

Referring to FIG. 3, the downstream side of seat 130 comprises surface 200. Surface 200 is adjacent to valve body 20 at interface 300. The upstream side of seat 130 comprises surface 210. Surface 210 is adjacent to plug 120 at interface 310. As shown, seat 130 may have a generally "L-shaped" configuration, such that surface 200 is larger than surface 210. In addition, there is a radially projecting shoulder 215 formed in the intermediate portion of seat 130. Thus, the outer surface of seat 130 comprises two distinct portions, surface 212 on the upstream side and surface 214 on the downstream side.

The downstream side of seat bushing 140 comprises surface 220. As shown in FIG. 3, recess 150 has a stepped configuration which forms radially projecting shoulder 230. At interface 320, shoulder 230 contacts a portion of surface 220 on seat bushing 140. The remainder of surface 220 on seat bushing 140 does not make contact with any other portion of valve 100. Instead, there is a chamber 340 formed by portions of surface 220, shoulder 215, surface 212, and shoulder 230. Chamber 340 will generally enclose an area of relatively low pressure, compared to the other portions of valve 100. The upstream side of seat bushing 140 comprises surface 240. Surface 240 does not contact any other portion of valve 100. Seat bushing 140 also comprises bottom surface 250, which contacts surface 212. Seat 130 and seat bushing 140 make contact with each other at the interface formed between surface 250 and surface 212.

In operation, when valve 100 is in the open position, the fluid within the interior bore 110 and cavity 106 will generally be at the same pressure. The fluid will generally exert pressure P1 on surface 200 of seat 130 at interface 300. This pressure will be exerted in an axial direction, as shown by the arrows in FIG. 4. Pressure P2 will also be exerted in the opposite axial direction on surface 210 of seat 130 at interface 310. Pressure P3 will also be exerted, in the same axial direction as P2, on surface 240 of seat bushing 140.

Due to the difference in surface area between surface 200 and surface 210, the total force (pressure times surface area) exerted by pressure P1 is greater than the total force exerted by pressure P2. This differential in force tends to urge seat 130 into sealing engagement with plug 120 at interface 310. In addition, although pressure P3 is exerted in the opposite direction of P1, it does not interfere with the sealing engagement of seat 130 because the combination of shoulder 230 and chamber 340 prevents surface 220 of seat bushing 140 from coming into contact with seat 130. Instead, pressure P3 is countered by a reaction force at shoulder 230. Accordingly, the differential in force resulting from pressure P1 as compared to P2 is sufficient to ensure a robust metal-to-metal seal at interface 310. In addition, as noted above, as the pressure within interior bore 110 increases, the difference in force exerted by P1 and P2 will also increase and so the performance of the seal, and thus the valve, will improve as the interior pressure increases. The foregoing description of the operation of valve 100 in the open position applies equally to the upstream and downstream side of plug 120.

Figure 4:
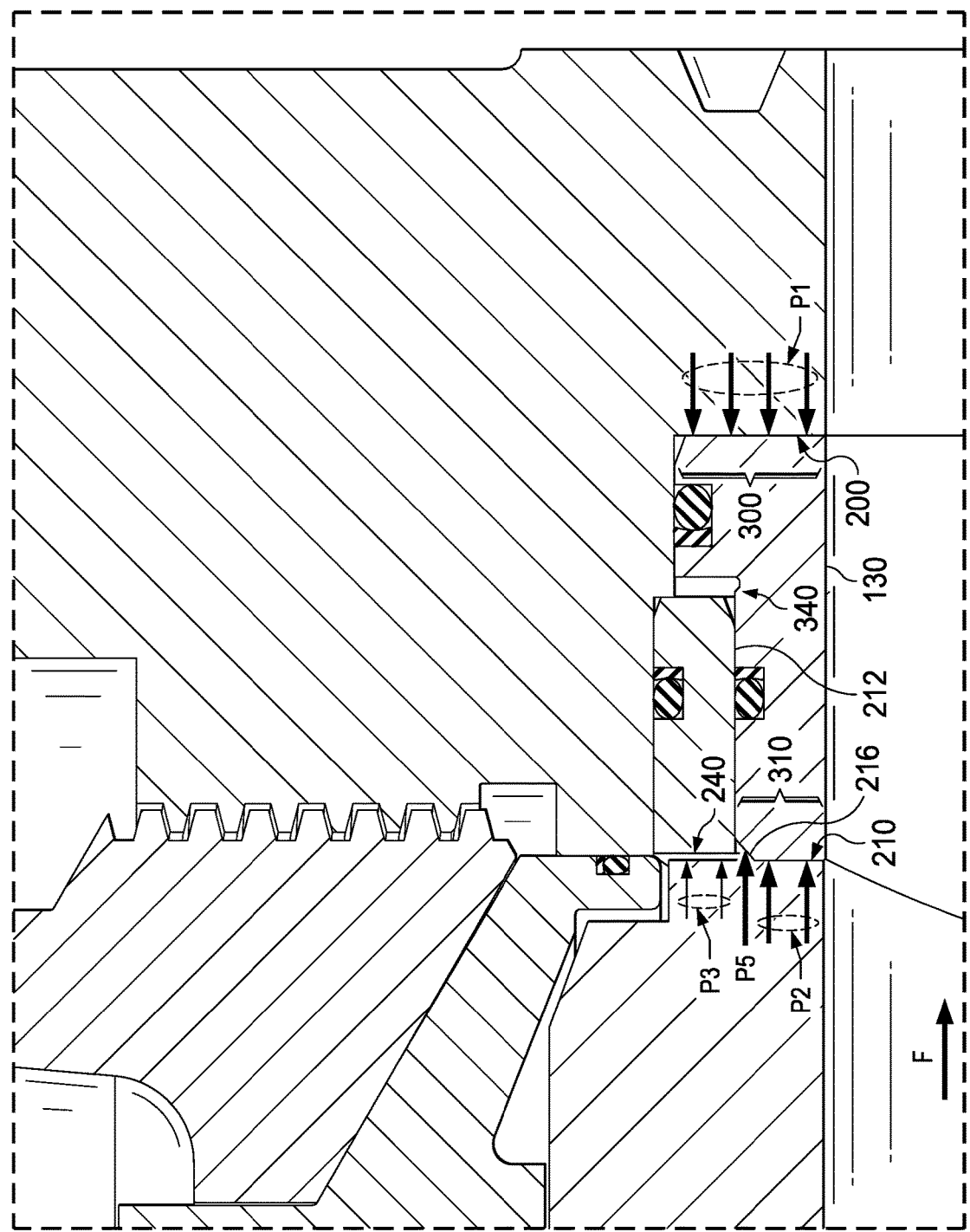
FIG. 4 depicts the same view as FIG. 3, with annotations indicating the pressure exerted by fluid when the valve is in the open position.

In certain situations, the fluid pressure in cavity 106 may be higher than the fluid pressure in bore 110. One point at which this scenario may occur is after pressure has been drained completely from bore 110, and the previous operating pressure, sometimes as high as 15,000 psi, may be contained in cavity 106. Such a pressure differential can be dangerous for personnel working in proximity to the valve, including for example maintenance personnel who attempt to service the valve while high pressure is trapped in cavity 106. To address such a situation, seat 130 may include a surface 216 at a smaller diameter than surface 212 to serve as a pressure-relieving feature for cavity 106. As shown in FIG. 4, surface 212 may take the form of a beveled corner. In this embodiment, the pressure in cavity 106 will cause a force P5 to be exerted on surface 216 with some component of the force acting in the axial direction away from plug 120. When the pressure in bore 110 is small enough such that the force P1 is smaller than the force P5, seat 130 will move away from plug 100, which will allow pressure in cavity 106 to drain into bore 110 across surface 210.

When valve 100 is in the closed position, the operation of valve body 20, plug 120, seat 130, and seat bushing 140 on the upstream side of plug 120 is essentially the same as that described above. Thus, the operation on the upstream side is independent of whether the valve is in the open or closed position.

Figure 5:
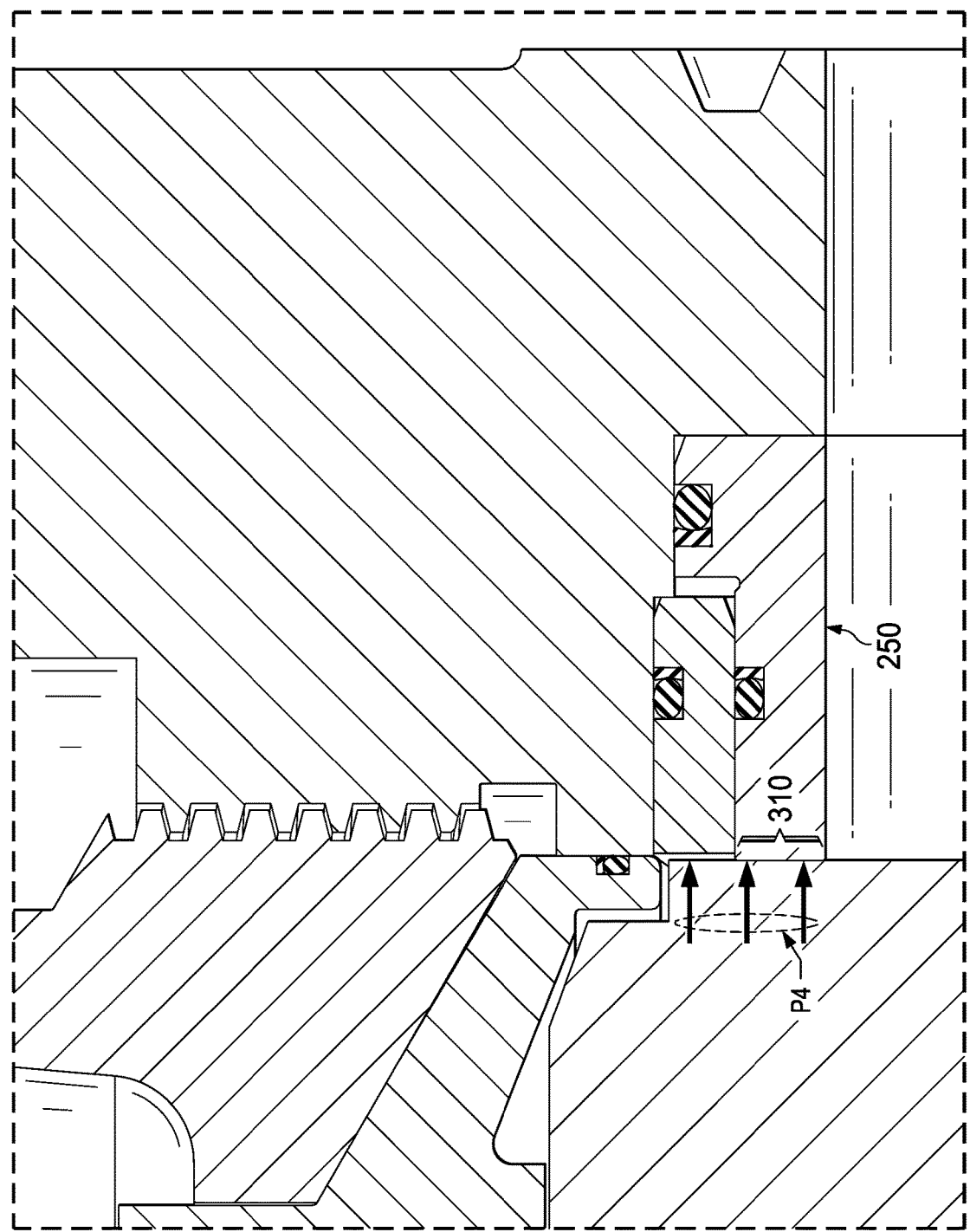
FIG. 5 depicts the same view as FIG. 4, when the valve is in the closed position.

When valve 100 is in the closed position, a seal is maintained on the downstream side of plug 120, but potentially via a different mechanism. If pressure is equalized, such that there remains approximately equal pressure on both the upstream and downstream sides of plug 120, then the sealing mechanism will be essentially the same as that described above when valve 100 is in the open position. However, if pressure is not equalized, such that upstream pressure exceeds downstream pressure, as shown in FIG. 5, pressure P4 is exerted by plug 120 in an axial direction but there is no (or lesser) pressure acting in the opposite direction of pressure P4. Accordingly, pressure P4 will tend to force plug 120 into seat 130 at interface 310. In this way, when valve 100 is in the closed position, a seal is maintained on both the upstream and downstream sides of plug 120, regardless of the relative pressure on either side of the plug.

As also shown in FIGS. 3 and 4, additional seals may be disposed at the interfaces between surface 250 of seat bushing 140 and surface 212 of seat 130, the interface between surface 214 of seat 130 and valve body 20, and/or the interface between the top surface of seat bushing 140 and valve body 20. Such seals may be elastomeric such as, for example, o-rings.

Referring to FIG. 6, an alternative embodiment is shown using a gate valve 400, rather than a valve that rotates, such as a plug or ball valve. Although the orientation of the components differs from the embodiment shown in FIGS. 1-5, the basic concept is the same. Extending between upstream flanged connection 410 and downstream flanged connection 430 is interior bore 510.

Figure 7:
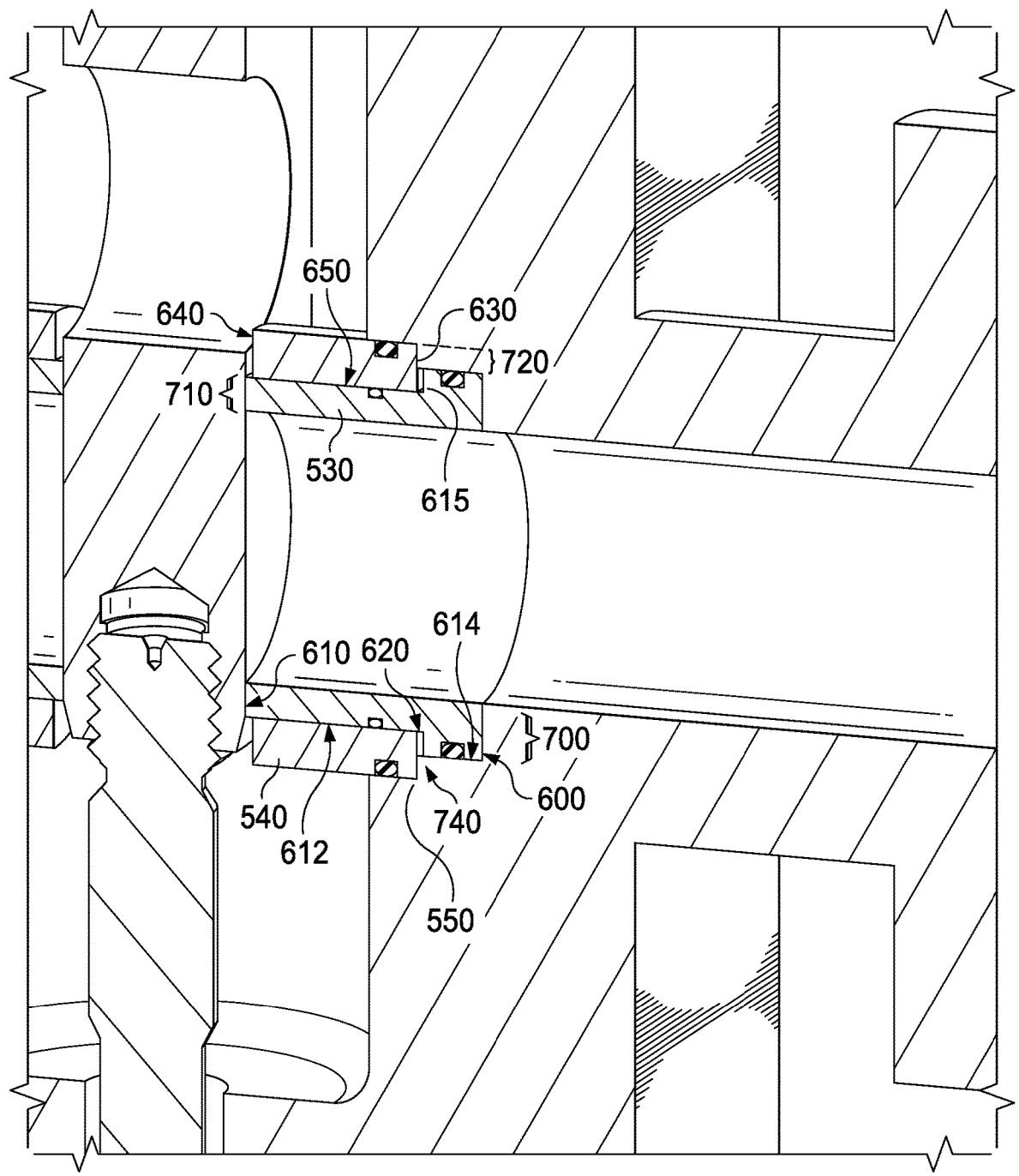
FIG. 7 depicts a close-up view of the seat and seat bushing in relation to the gate and valve body when the alternative gate valve embodiment shown in FIG. 7 is in the closed position.

Within valve body 420 is disposed gate 520, seat 530 and seat bushing 540. Seat 530 and seat bushing 540 are generally annular in shape and both located within recess 550 formed in the valve body. Cavity 406 is formed within valve body 420 and gate 520 moves within cavity 406. Referring to FIG. 7, the downstream side of seat 530 comprises surface 600. Surface 600 is adjacent to valve body 420 at interface 700. The upstream side of seat 530 comprises surface 610. Surface 610 is adjacent to gate 520 at interface 710. As shown, seat 530 may have a generally "L-shaped" configuration, such that surface 600 is larger than surface 610. In addition, there is a radially projecting shoulder 615 formed in the intermediate portion of seat 530. Thus, the outer surface of seat 530 comprises two distinct portions, surface 612 on the upstream side and surface 614 on the downstream side.

The downstream side of seat bushing 540 comprises surface 620. As shown in FIG. 7, recess 550 has a stepped configuration which forms radially projecting shoulder 630. At interface 720, shoulder 630 contacts a portion of surface 620 on seat bushing 540. The remainder of surface 620 on seat bushing 540 does not make contact with any other portion of valve 400. Instead, there is a chamber 740 formed by portions of surface 620, shoulder 615, surface 612, and shoulder 630. Chamber 740 will generally enclose an area of relatively low pressure, compared to the other portions of valve 400. The upstream side of seat bushing 540 comprises surface 640. Surface 640 does not contact any other portion of valve 400. Seat bushing 540 also comprises bottom surface 650, which contacts surface 612. Seat 530 and seat bushing 540 make contact with each other at the interface formed between surface 650 and surface 612.

Figure 8:
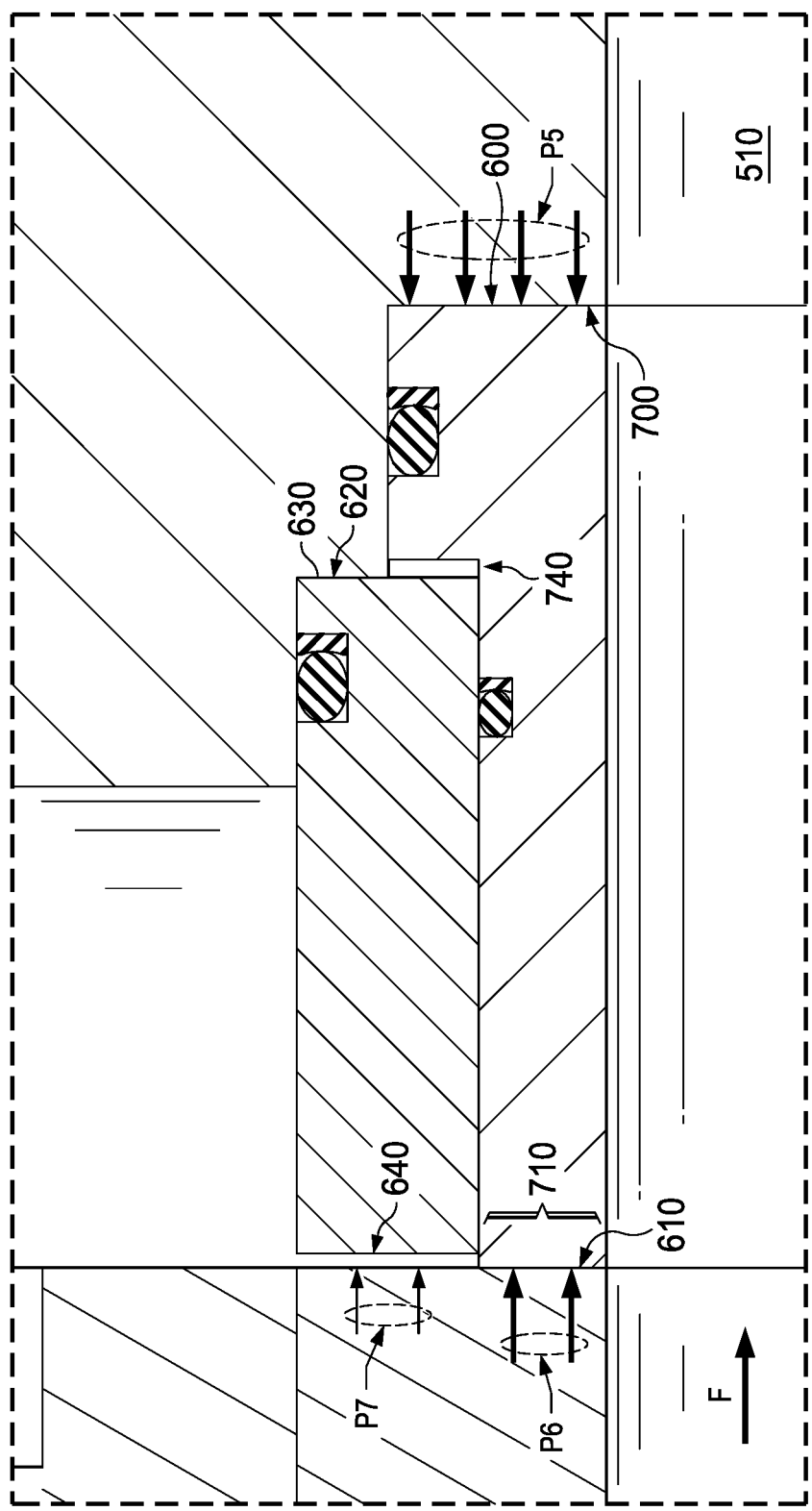
FIG. 8 depicts a close-up side view of the alternative gate valve embodiment shown in FIG. 7, with the valve in the open position and annotations indicating the pressure exerted by fluid when the alternative gate valve embodiment is in this position.

In operation, when valve 400 is in the open position, the fluid within the interior bore 510 will generally exert pressure P5 on surface 600 of seat 530 at interface 700. This pressure will be exerted in an axial direction, as shown by the arrows in FIG. 8. Pressure P6 will also be exerted in the opposite axial direction on surface 610 of seat 530 at interface 710. Pressure P7 will also be exerted, in the same axial direction as P6, on surface 640 of seat bushing 540.

Due to the difference in surface area between surface 600 and surface 610, the total force (pressure times surface area) exerted by pressure P5 is greater than the total force exerted by pressure P6. This differential in force tends to urge seat 530 into sealing engagement with gate 520 at interface 710. In addition, although pressure P7 is exerted in the opposite direction of P5, it does not interfere with the sealing engagement of seat 530 because the combination of shoulder 630 and chamber 740 prevents surface 620 of seat bushing 540 from coming into contact with seat 530. Instead, pressure P7 is countered by a reaction force at shoulder 630. Accordingly, the differential in force resulting from pressure P5 as compared to P6 is sufficient to ensure a robust metal-to-metal seal at interface 710. In addition, as noted above, as the pressure within interior bore 510 increases, the difference in force exerted by P5 and P6 will also increase and so the performance of the seal, and thus the valve, will improve as the interior pressure increases. The foregoing description of the operation of valve 400 in the open position applies equally to the upstream and downstream side of gate 520.

When valve 400 is in the closed position, the operation of valve body 420, gate 520, seat 530, and seat bushing 540 on the upstream side of gate 520 is essentially the same as that described above. Thus, the operation on the upstream side is independent of whether the valve is in the open or closed position.

It will be understood by those of skill in the art that seat 530 may include a pressure relief feature similar to that described above in connection with seat 130, such that valve 400 will not experience extreme pressure differentials between cavity 406 and bore 510.

Figure 9:
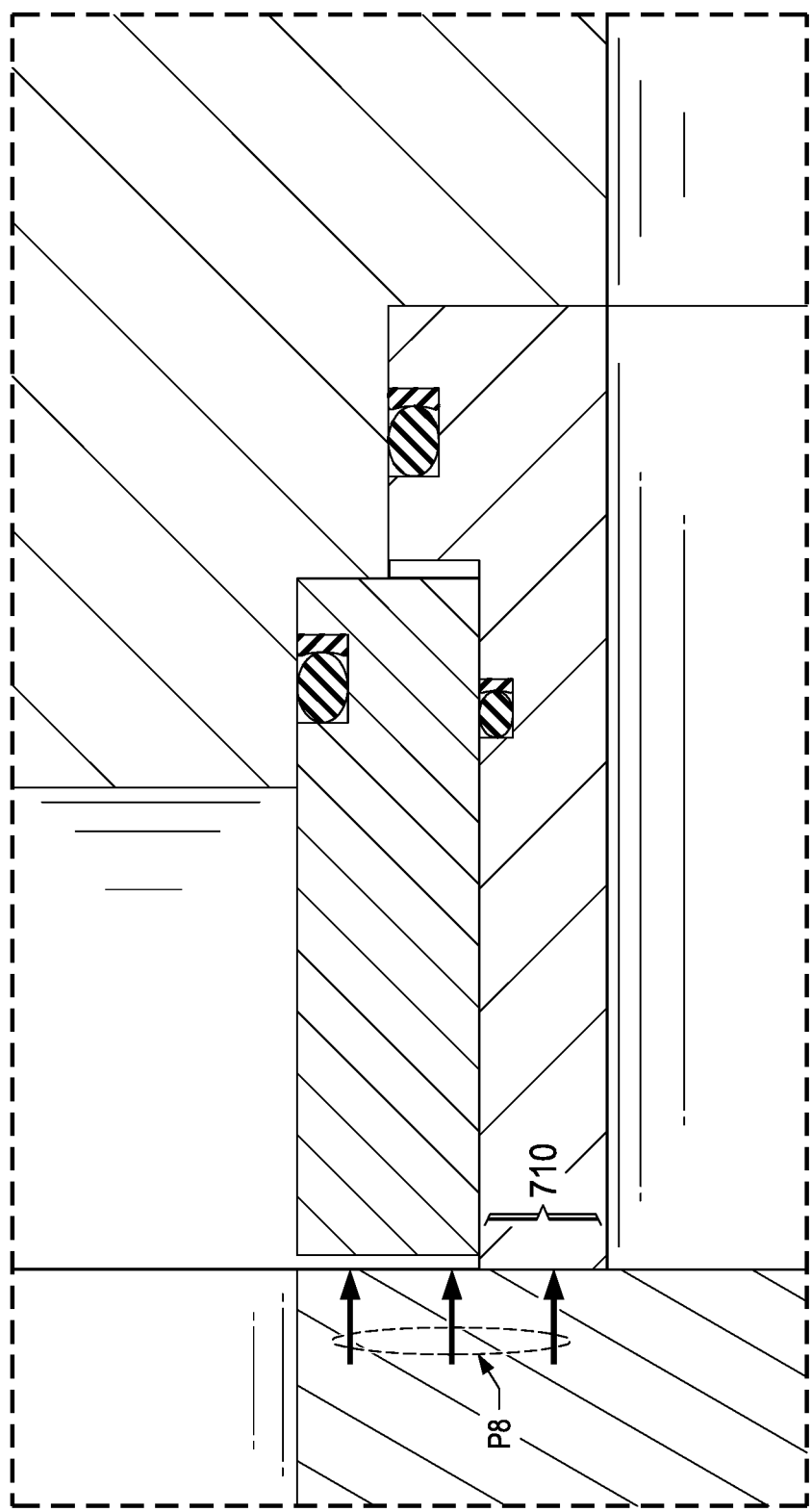
FIG. 9 depicts the same view as FIG. 8, when the valve is in the closed position.

When valve 400 is in the closed position, a seal is maintained on the downstream side of gate 520, but potentially via a different mechanism. If pressure is equalized, such that there remains approximately equal pressure on both the upstream and downstream sides of gate 520, then the sealing mechanism will be essentially the same as that described above when valve 400 is in the open position. However, if pressure is not equalized, such that upstream pressure exceeds downstream pressure, as shown in FIG. 9, pressure P8 is exerted by gate 520 in an axial direction but there is no (or lesser) pressure acting in the opposite direction of pressure P8. Accordingly, pressure P8 will tend to force gate 520 into seat 530 at interface 710. In this way, when valve 400 is in the closed position, a seal is maintained on both the upstream and downstream sides of gate 520, regardless of the relative pressure on either side of the gate.

Figure 9A:
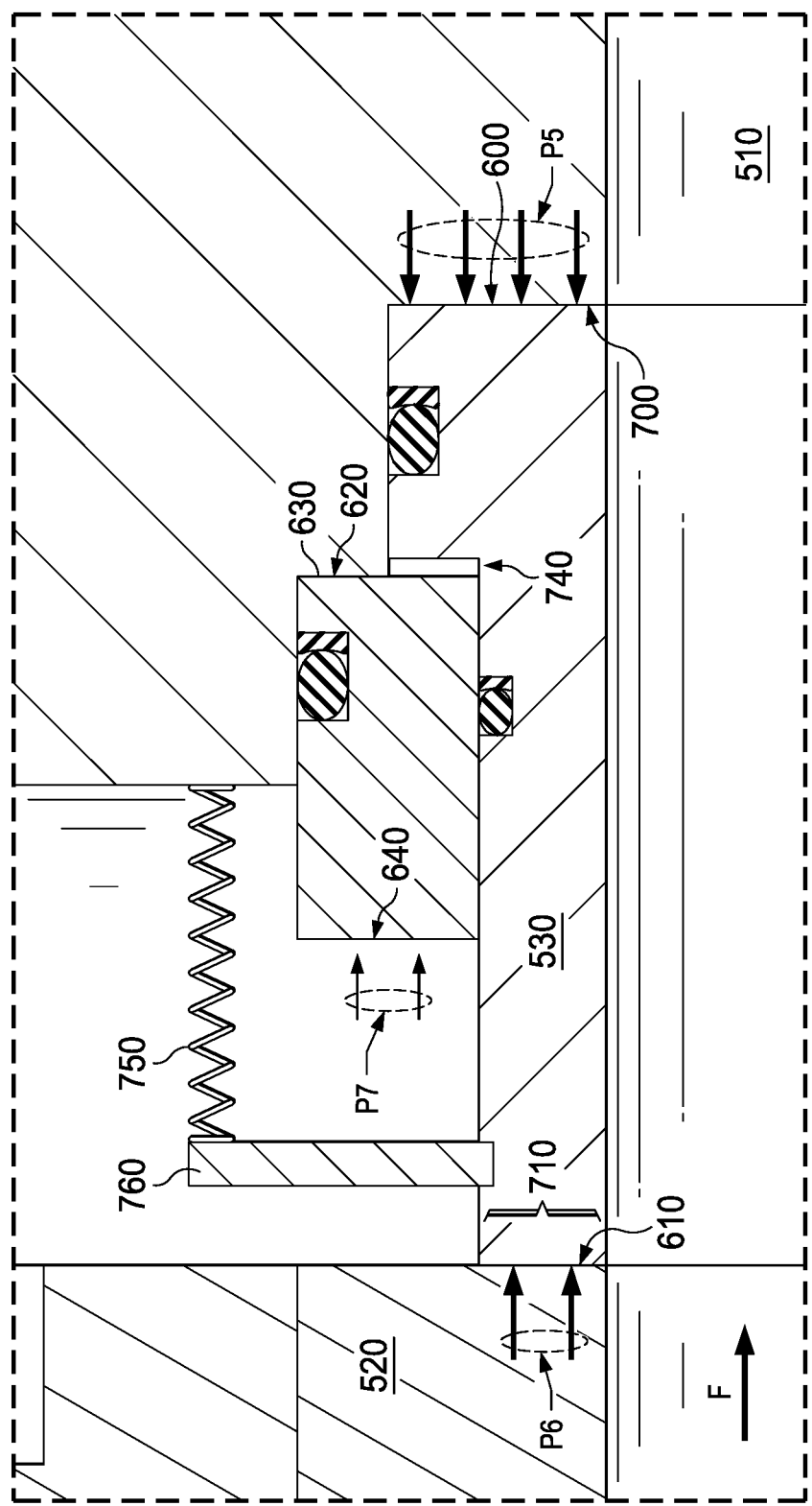
FIGS. 9A-9B depict close-up side views of the seat and seat bushing in relation to the gate and valve body of additional alternative gate valve embodiments including a biasing member.
Figure 9B:
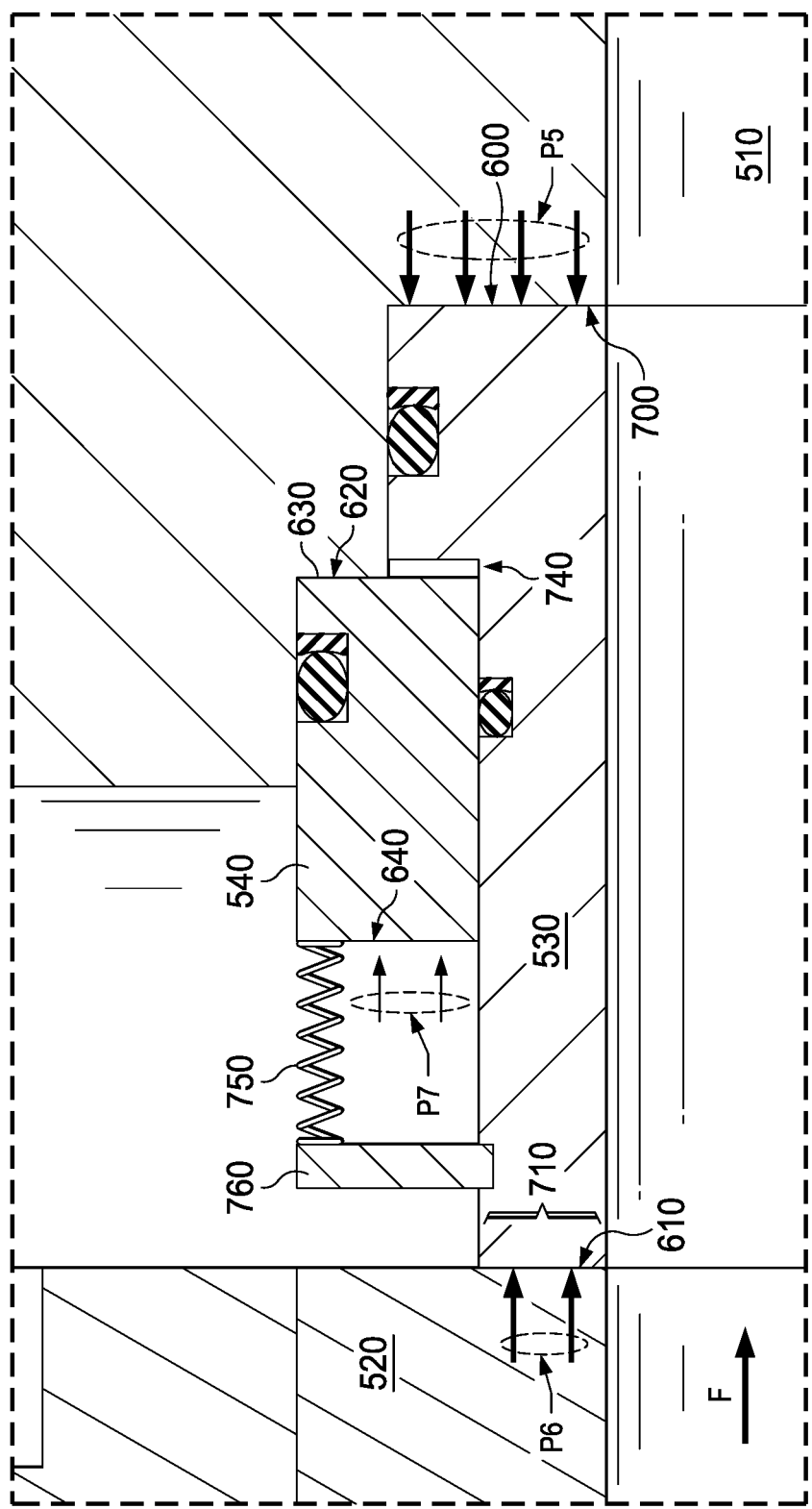

Referring to FIG. 9A, an alternative embodiment of valve 400 is shown. Support 760 may be attached to seat 530 and extending in a generally radial direction, with biasing member 750 extending axially between support 760 and valve body 420. Biasing member 750 may be a spring, a Belleville washer, or any other suitable device that is biased to exert axial pressure on support 760 in the direction of gate 520. Support 760 may be a post, arm, spoke, or any radially extending structure configured to transmit the axial force exerted by biasing member 750. As a result of the attachment between seat 530 and support 760, the axial force exerted by biasing member 750 assists in maintaining a seal between seat 530 and gate 520, particularly under low-pressure operating conditions. As shown in FIG. 9B, biasing member 750 may instead extend axially between support 760 and seat bushing 540.

Referring to FIG. 10, an alternative embodiment of a valve 800 is shown. Similar to valve 100 shown in FIG. 2, extending between upstream flanged connection 810 and downstream flanged connection 830 is interior bore 805.

Within valve body 820 is disposed gate 920, seat 930, seat bushing 940, and body bushing 945. Seat 930, seat bushing 940, and body bushing 945 are generally annular in shape and both located within recess 950 formed in the valve body. Seat 930, seat bushing 940, and body bushing 945 may be formed of metal, such as stainless steel. Alternatively, seat 930 may be formed of a material different from seat bushing 940 and/or body bushing 945, in order to be more resistant to the forces exerted on seat 930 as a result of its sealing engagement with gate 920. Cavity 806 is formed within valve body 820 and gate 920 moves within cavity 806. Fluid may flow through interior bore 805 in the direction indicated by arrow F but, as noted above in connection with the other disclosed embodiments, fluid may also flow in the opposite direction and the valve will still function as described below.

Figure 11:
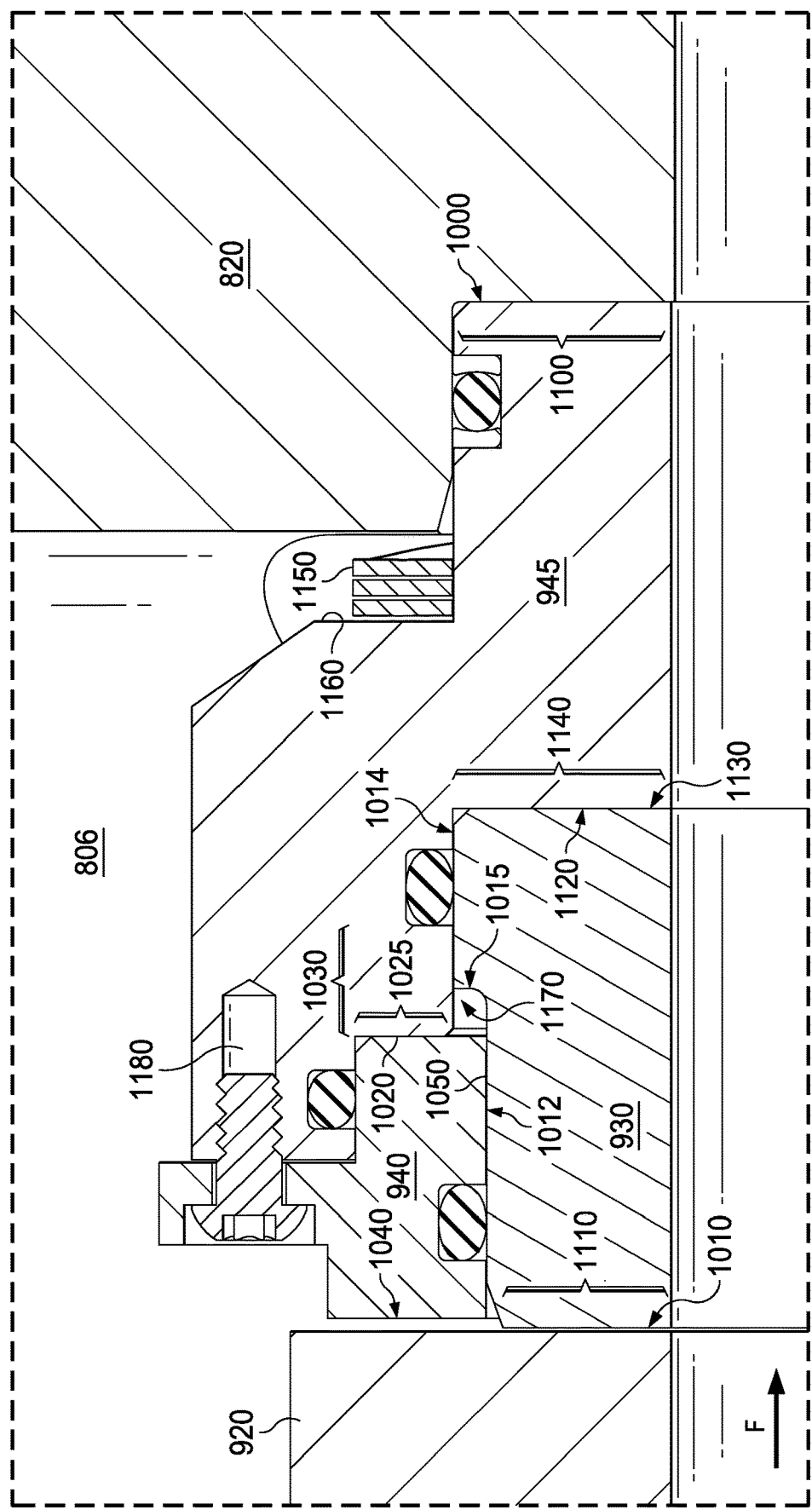
FIG. 11 depicts a close-up view of the seat, body bushing, and seat bushing in relation to the gate and valve body when the embodiment of the valve shown in FIG. 10 is in the open position.

Referring to FIG. 11, the downstream side of body bushing 945 comprises surface 1000. Surface 1000 is adjacent to valve body 820 at interface 1100. The upstream side of body bushing 945 comprises surface 1120. The downstream side of seat 930 comprises surface 1130. Surface 1120 of body bushing 945 is adjacent to surface 1130 of seat 930 at interface 1140. As shown in FIG. 11, the area of surface 1120 and the area of surface 1130 are preferably substantially equivalent.

The upstream side of seat 930 comprises surface 1010. Surface 1010 is adjacent to gate 920 at interface 1110. As shown, seat 930 may have a generally "L-shaped" configuration, such that surface 1010 is smaller than surface 1130. Similarly, surface 1000 of body bushing 945 may be smaller than surface 1120. In addition, there is a radially projecting shoulder 1015 formed in the intermediate portion of seat 930. Thus, the outer surface of seat 930 comprises two distinct portions, surface 1012 on the upstream side and surface 1014 on the downstream side.

The downstream side of seat bushing 940 comprises surface 1020. As shown in FIG. 11, body bushing 945 has a stepped configuration which forms radially projecting shoulder 1030. At interface 1025, shoulder 1030 of body bushing 945 contacts a portion of surface 1020 on seat bushing 940. The remainder of surface 1020 on seat bushing 940 does not make contact with any other portion of valve 800. Instead, there is a chamber 1170 formed by portions of surface 1020, shoulder 1015, surface 1012, and shoulder 1030. Chamber 1170 will generally enclose an area of relatively low pressure, compared to the other portions of valve 800. The upstream side of seat bushing 940 comprises surface 1040. Surface 1040 does not contact any other portion of valve 800. Seat bushing 940 also comprises bottom surface 1050, which contacts surface 1012. Seat 930 and seat bushing 940 make contact with each other at the interface formed between surface 1050 and surface 1012.

Figure 12:
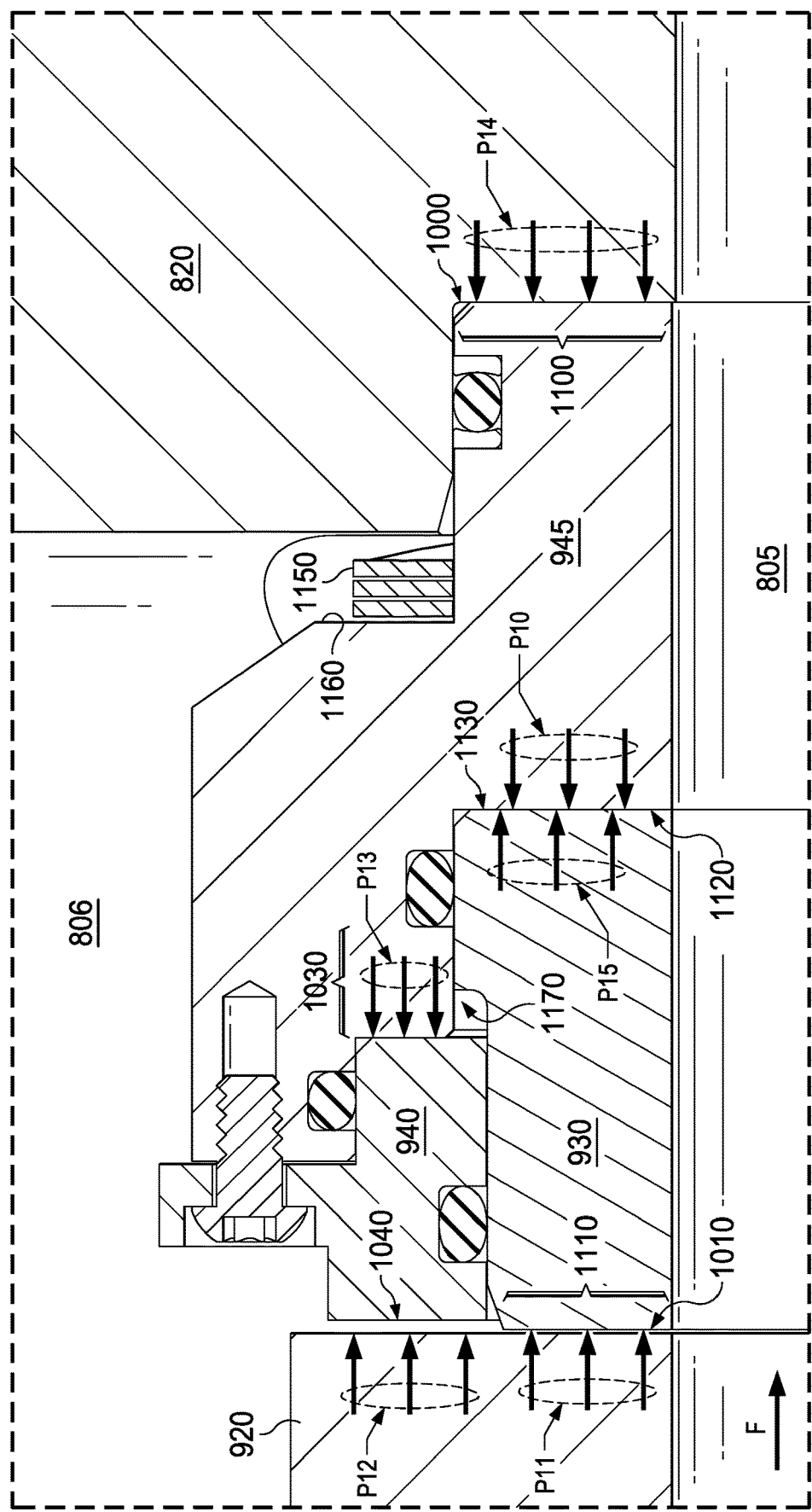
FIG. 12 depicts the same view as FIG. 11, with annotations indicating the pressure exerted by fluid when the valve is in the open position.

In operation, when valve 800 is in the open position, the fluid within the interior bore 805 and cavity 806 will generally be the same pressure. The fluid will generally exert pressure P10 on surface 1130 of seat 930 at interface 1140. This pressure will be exerted in an axial direction, as shown by the arrows in FIG. 12.

Pressure P11 will also be exerted in the opposite axial direction on surface 1010 of seat 930 at interface 1110. Pressure P12 will also be exerted, in the same axial direction as P11, on surface 1040 of seat bushing 940.

Due to the difference in surface area between surface 1130 and surface 1010, the total force (pressure times surface area) exerted by pressure P10 is greater than the total force exerted by pressure P11. This differential in force tends to urge seat 930 into sealing engagement with gate 920 at interface 1110. In addition, although pressure P12 is exerted in the opposite direction of P10, it does not interfere with the sealing engagement of seat 930 because the combination of shoulder 1030 of body bushing 945 and chamber 1170 prevents surface 1020 of seat bushing 940 from coming into contact with seat 930. Instead, pressure P12 transfers to body bushing 945 by a reaction force P13 at shoulder 1030, causing body bushing 945 to axially engage valve body 820 at interface 1100. Accordingly, the differential in force resulting from pressure P10 as compared to P11 is sufficient to ensure a robust metal-to-metal seal at interface 1110. In addition, as noted above, as the pressure within interior bore 805 increases, the difference in force exerted by P10 and P11 will also increase and so the performance of the seal, and thus the valve, will improve as the interior pressure increases.

It will be understood by those of skill in the art that seat 930 may include a pressure relief feature similar to that described above in connection with seat 130, such that valve 800 will not experience extreme pressure differentials between cavity 806 and bore 805.

The foregoing description of the operation of valve 800 in the open position applies equally to the upstream and downstream side of gate 920. When valve 800 is in the closed position, the operation of valve body 820, gate 920, seat 930, seat bushing 940 and body bushing 945 on the upstream side of gate 920 is essentially the same as that described above. Thus, the operation on the upstream side is independent of whether the valve is in the open or closed position.

Figure 13:
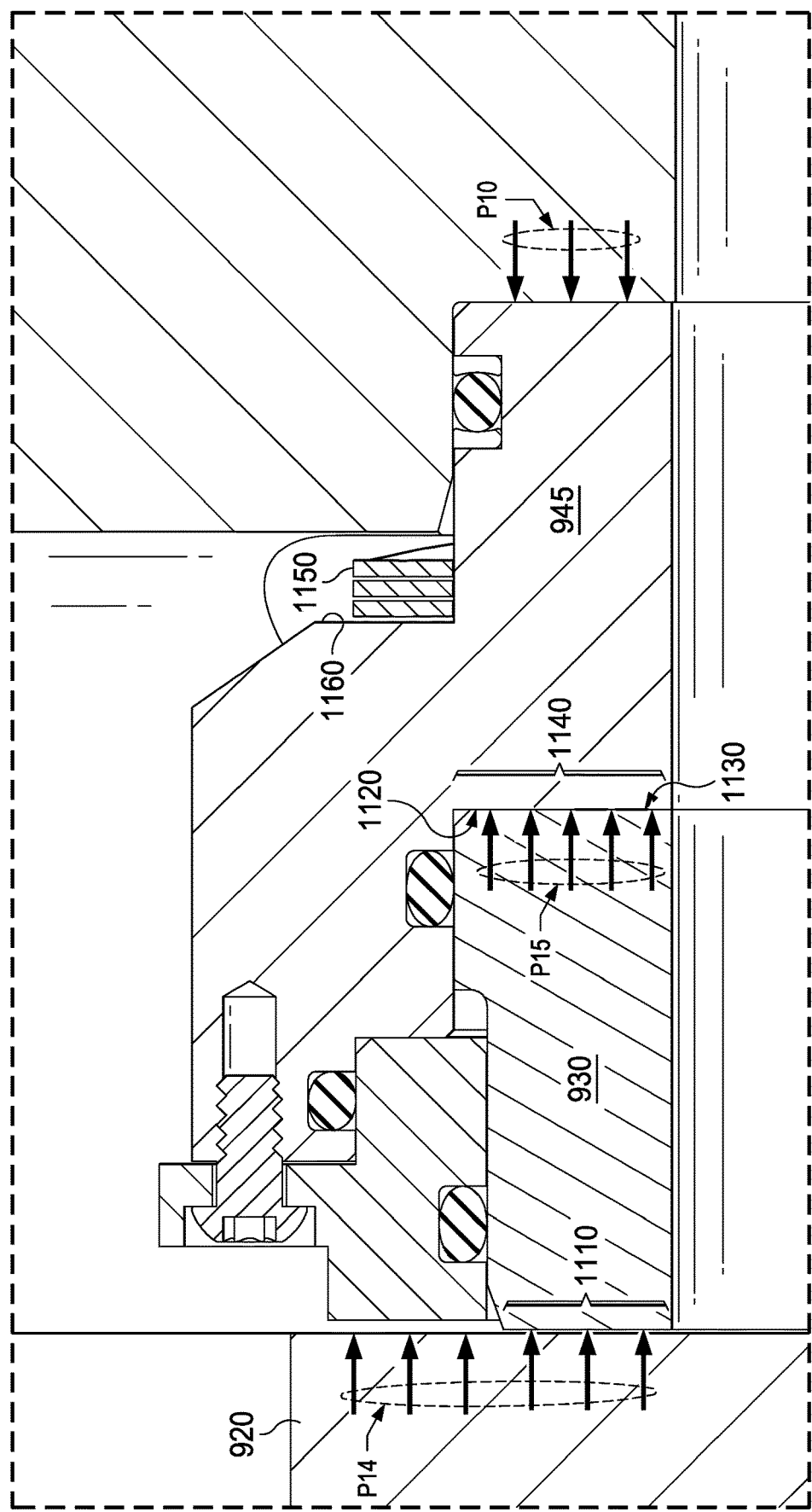
FIG. 13 depicts the same view as FIG. 12, when the valve is in the closed position.

When valve 800 is in the closed position, a seal is maintained on the downstream side of gate 920, but potentially via a different mechanism. If pressure is equalized, such that there remains approximately equal pressure on both the upstream and downstream sides of gate 920, then the sealing mechanism will be essentially the same as that described above when valve 800 is in the open position. However, if pressure is not equalized, such that upstream pressure exceeds downstream pressure, as shown in FIG. 13, pressure P14 is exerted by gate 920 in an axial direction but there is no (or lesser) pressure acting in the opposite direction of pressure P14. Accordingly, pressure P14 will tend to force gate 920 into seat 930 at interface 1110. Seat 930 will exert pressure P15 on seat bushing 945 by virtue of the contact between surface 1120 of body bushing 945 and surface 1130 of seat 930 at interface 1140. In this way, when valve 800 is in the closed position, a seal is maintained on both the upstream and downstream sides of gate 920, regardless of the relative pressure on either side of the plug.

As also shown in FIGS. 10-13, additional seals may be disposed at the various interfaces between the surfaces of seat 930, seat bushing 940, and body bushing 945. Although these seals may be elastomeric, similar to those described above in connection with the other embodiments, the embodiment shown in FIGS. 10-13 provides at least one additional advantage. Because seat 930 does not directly contact valve body 820, there is no need for any of the seals to be located in a recess formed by removing material from either seat 930 or valve body 820. As shown in FIGS. 10-13, all seals may be located in grooves formed in seat bushing 940 or body bushing 945, which aids in manufacturing and durability of the overall design of valve 800.

As also shown in FIGS. 10-13, biasing member 1150 may be located between annular shoulder 1160 of body bushing 945 and valve body 820. Biasing member 1150 may be a spring, a Belleville washer, or any other suitable device that is biased to exert axial pressure on annular shoulder 1160 in the direction of gate 920. As a result of the contact between surface 1120 of body bushing 945 and surface 1130 of seat 930 at interface 1140, the axial force exerted by biasing member 1150 assists in maintaining a seal between seat 930 and gate 920, particularly under low-pressure operating conditions.

As also shown in FIGS. 10-13, seat bushing 940 and body bushing 945 may be connected through the use of attachment member 1180. Attachment member 1180 may be a screw, pin, or any other suitable device to fixedly connect seat bushing 940 and body bushing 945, ensuring that surface 1040 of seat bushing 940 does not contact gate 920.

The addition of body bushing 945 has several potential benefits in comparison to the embodiment shown in FIGS. 1-9. The use of body bushing 945 allows for the use of a seat 930 that is significantly smaller than seat 130. The seat is generally the component within this type of valve that must be replaced the most frequently, and it is often formed of materials that are more expensive than those used to form the other components. Accordingly, using a smaller seat makes the overall design of the valve more economical. In addition, as noted above, the use of body bushing 945 avoids potential problems associated with locating sealing elements within grooves formed in either seat 930 or valve body 820. In addition, the use of body bushing 945 facilitates the use of biasing member 1150 to aid in low-pressure sealing.

Figure 12A:
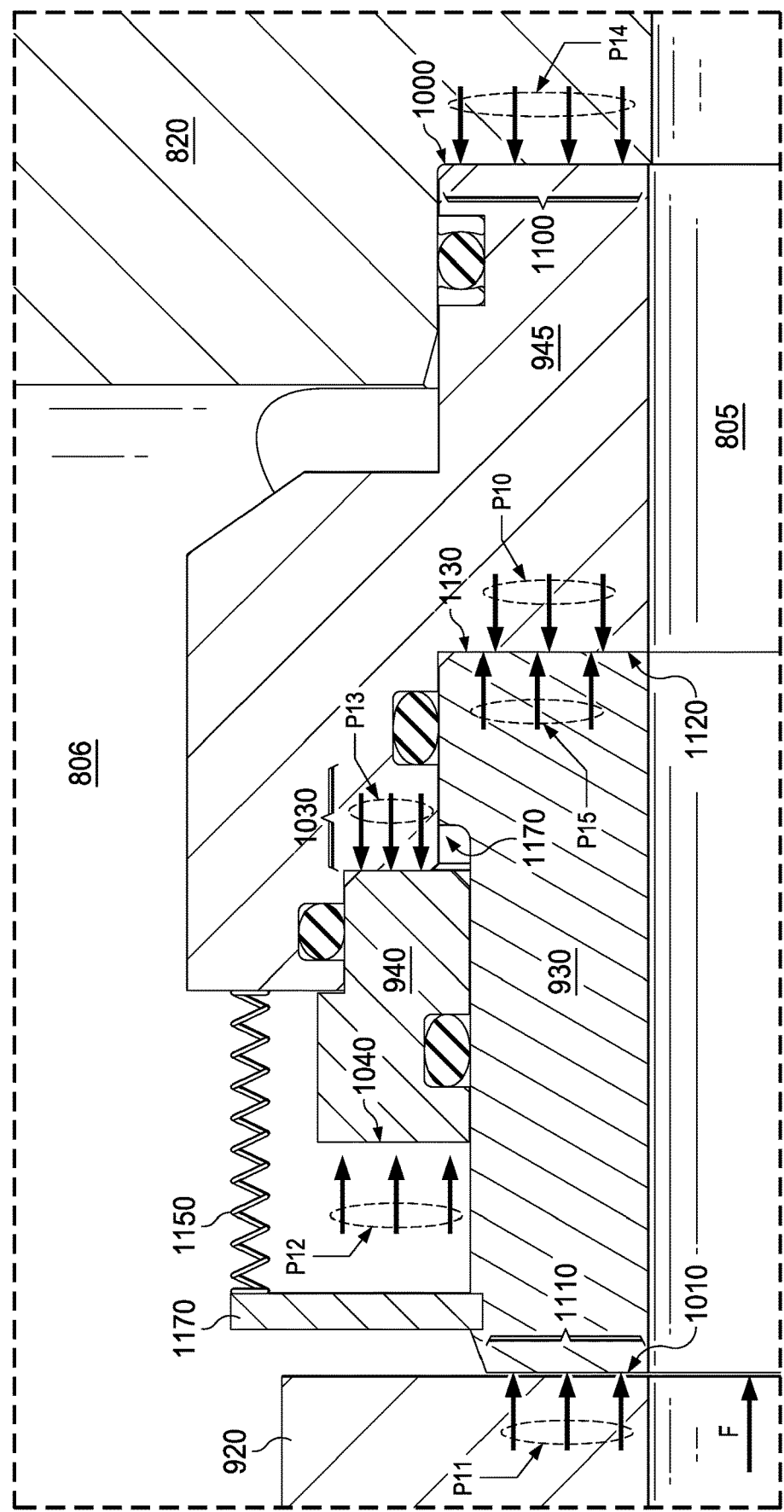
FIGS. 12A-12B depict close-up side views of the seat, body bushing, and seat bushing in relation to the gate and valve body of additional alternative gate valve embodiments including a biasing member.
Figure 12B:
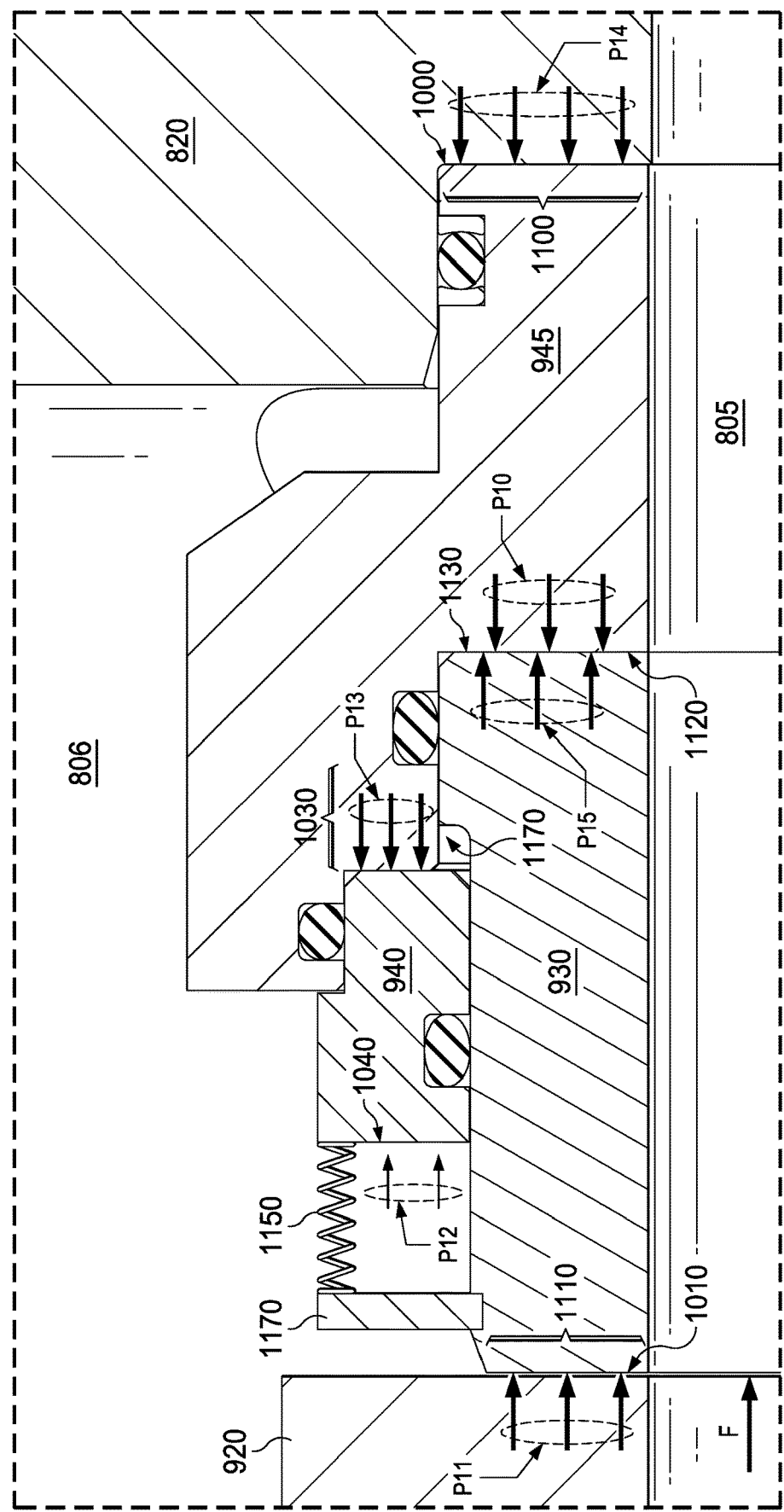

Referring to FIG. 12A, an alternative embodiment of valve 800 is shown. Support 1170 may be attached to seat 930 and extending in a generally radial direction, with biasing member 1150 extending axially between support 1170 and body bushing 945. Biasing member 1150 may be a spring, a Belleville washer, or any other suitable device that is biased to exert axial pressure on support 1170 in the direction of gate 920. Support 1170 may be a post, arm, spoke, or any radially extending structure configured to transmit the axial force exerted by biasing member 1150. As a result of the attachment between seat 930 and support 1170, the axial force exerted by biasing member 1150 assists in maintaining a seal between seat 930 and gate 920, particularly under low-pressure operating conditions. As shown in FIG. 12B, biasing member 1150 may instead extend axially between support 1170 and seat bushing 940.

Figure 14:
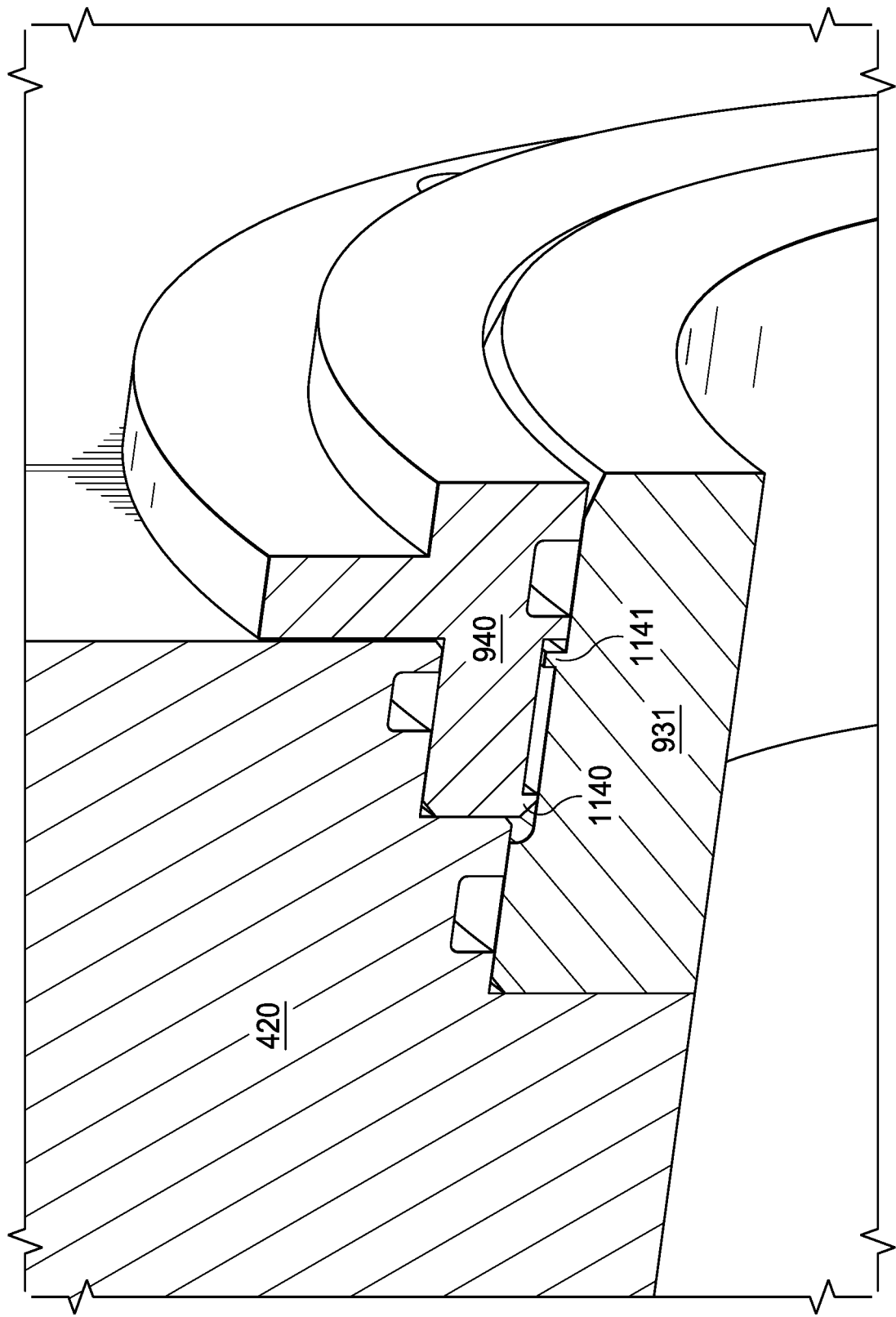
FIG. 14 depicts the keyed portions of the seat bushing and seat of an alternative embodiment of the valve.
Figure 15:
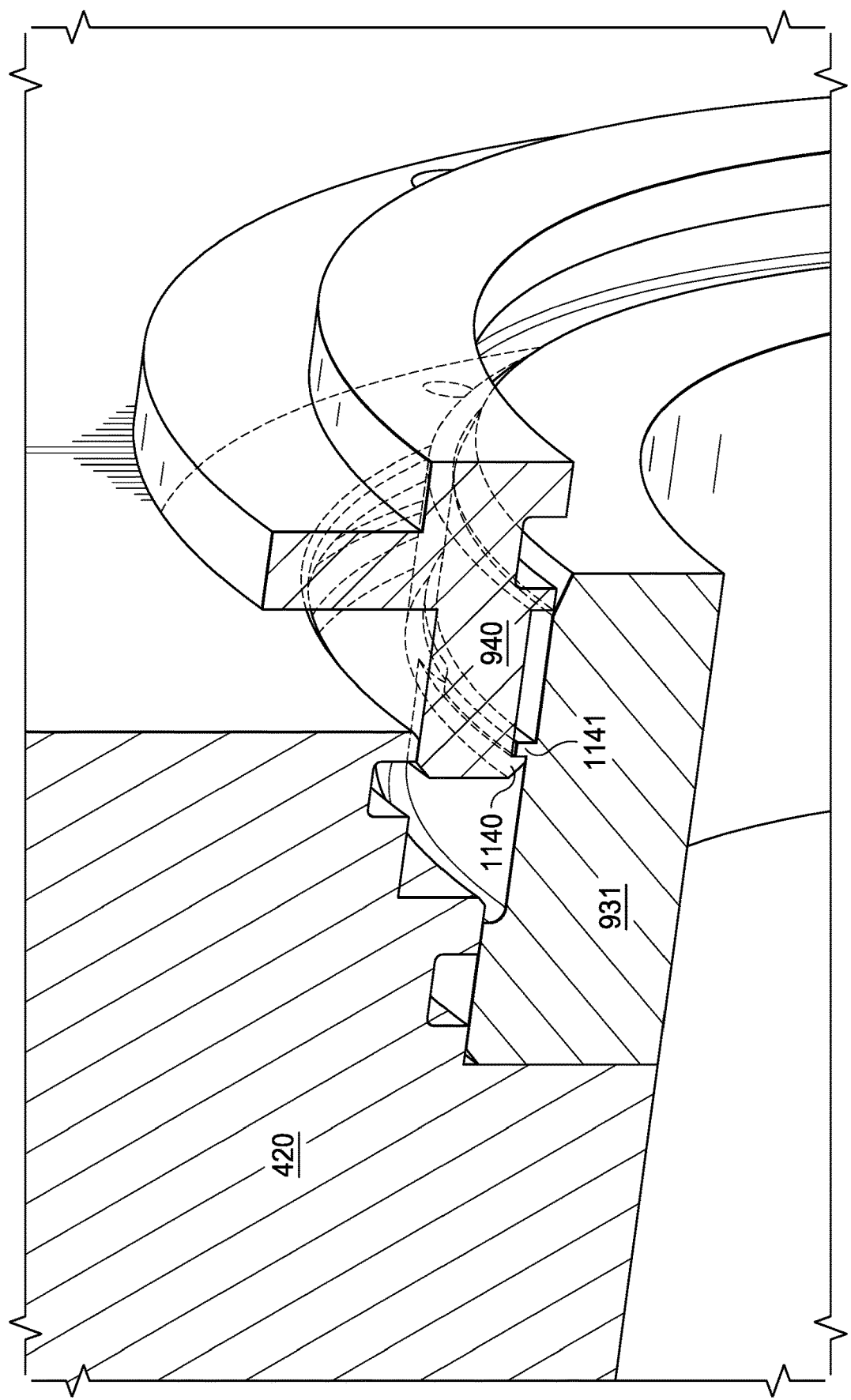
FIG. 15 depicts the seat bushing being displaced relative to the valve body to engage the seat bushing's keyed portions with the seat's keyed portions for more easily removing the seat from the body of the valve.
Figure 15A:
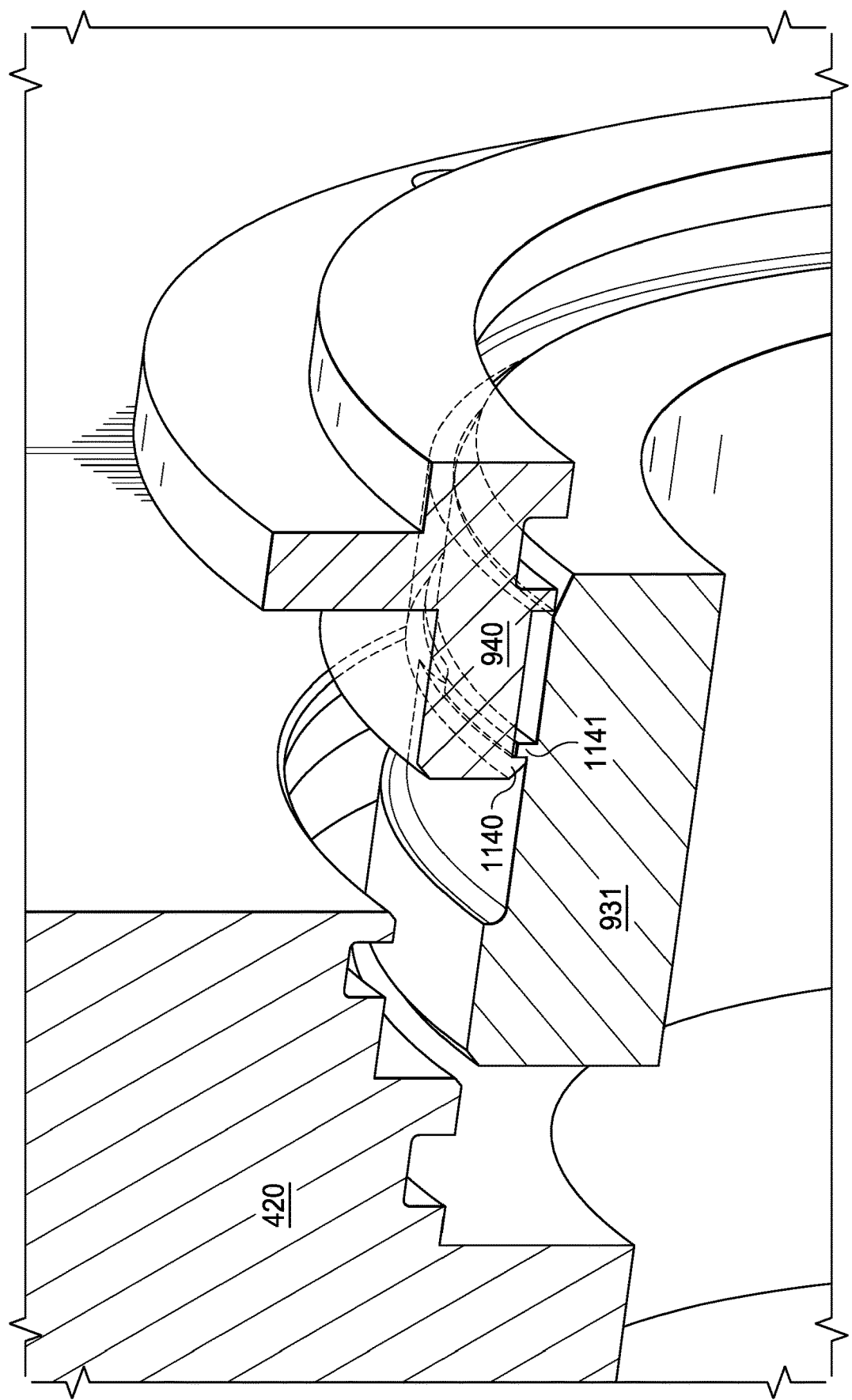
FIG. 15A depicts the seat shown in FIG. 15 being removed from the valve body using the engagement of the keyed portions of the seat and seat bushing.
Figure 16:
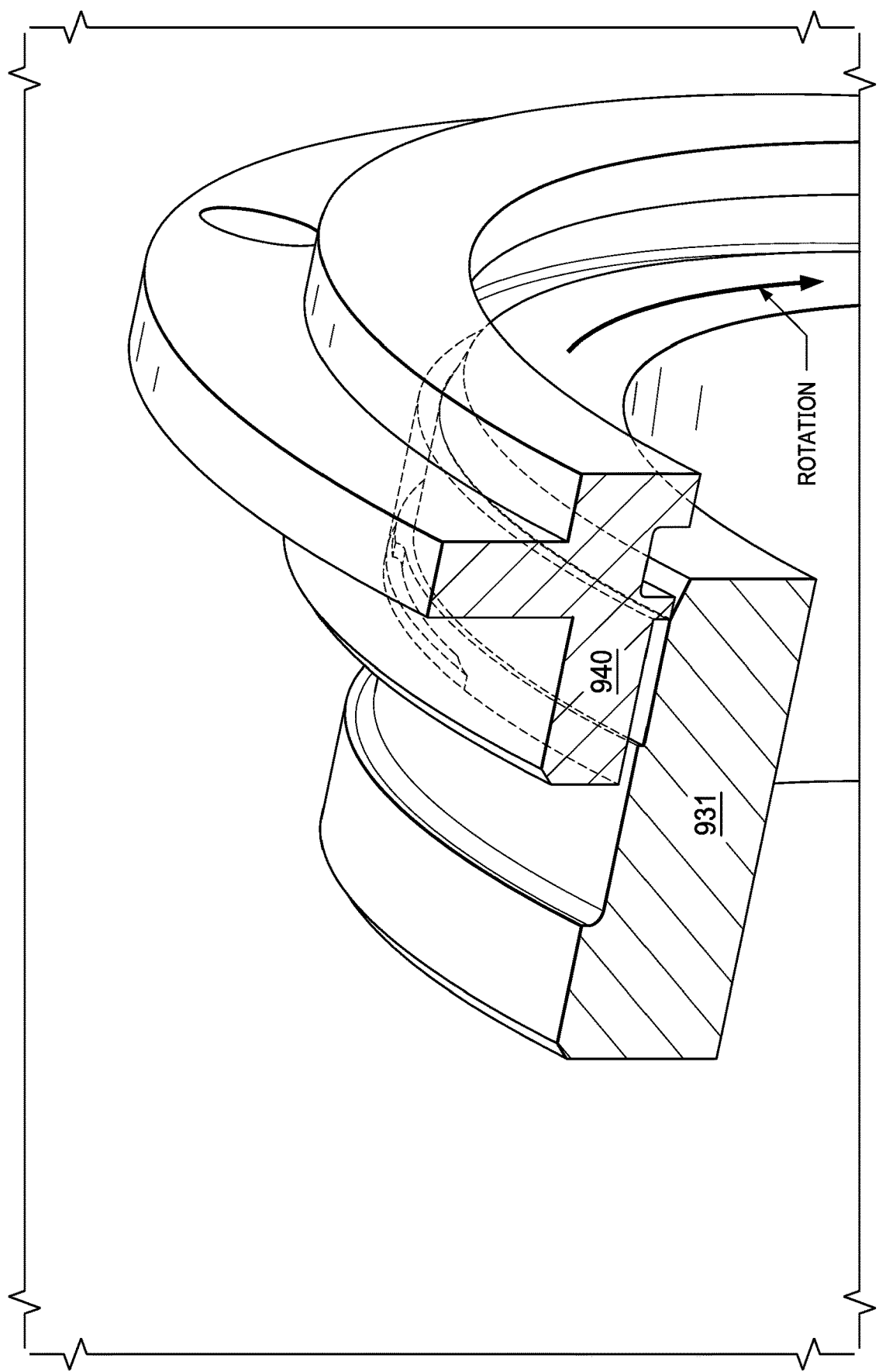
FIG. 16 depicts the keyed portions of the seat bushing and seat disengaged to allow them to be separated from one another.

Referring to FIG. 14, an alternative embodiment of a valve 400 is shown. This embodiment shows the potential for use of a keyed seat bushing 940 and seat 931 relative to valve body 420 to facilitate removal of seat 931 from valve body 420. Seat 931 may have a keyed portion at 1141 and seat bushing 940 may have a keyed portion at 1140. FIG. 14 shows the keyed portions when seat bushing 940 and seat 931 are installed in valve body 420 during standard operation of valve 400. FIG. 15 shows seat bushing 940 partially removed from valve body 420 such that keyed portion 1140 of seat bushing 940 is engaged with keyed portion 1141 of seat 931 during disassembly of valve 400. FIG. 15A shows seat bushing 940 removing seat 931 from valve body 420 via keyed portions 1140 and 1141. FIG. 16 shows the disengaged arrangement of keyed portions 1140 and 1141 to allow seat bushing 940 and seat 931 to be separated from each other when one of them is rotated. Thus, the operation of the valve would not be diminished through the use of the keyed seat 931 and seat bushing 940, but rather maintenance cost and down time would be reduced because of the ability to more quickly change out a worn seat 931 in the valve 400.

Figure 17A:
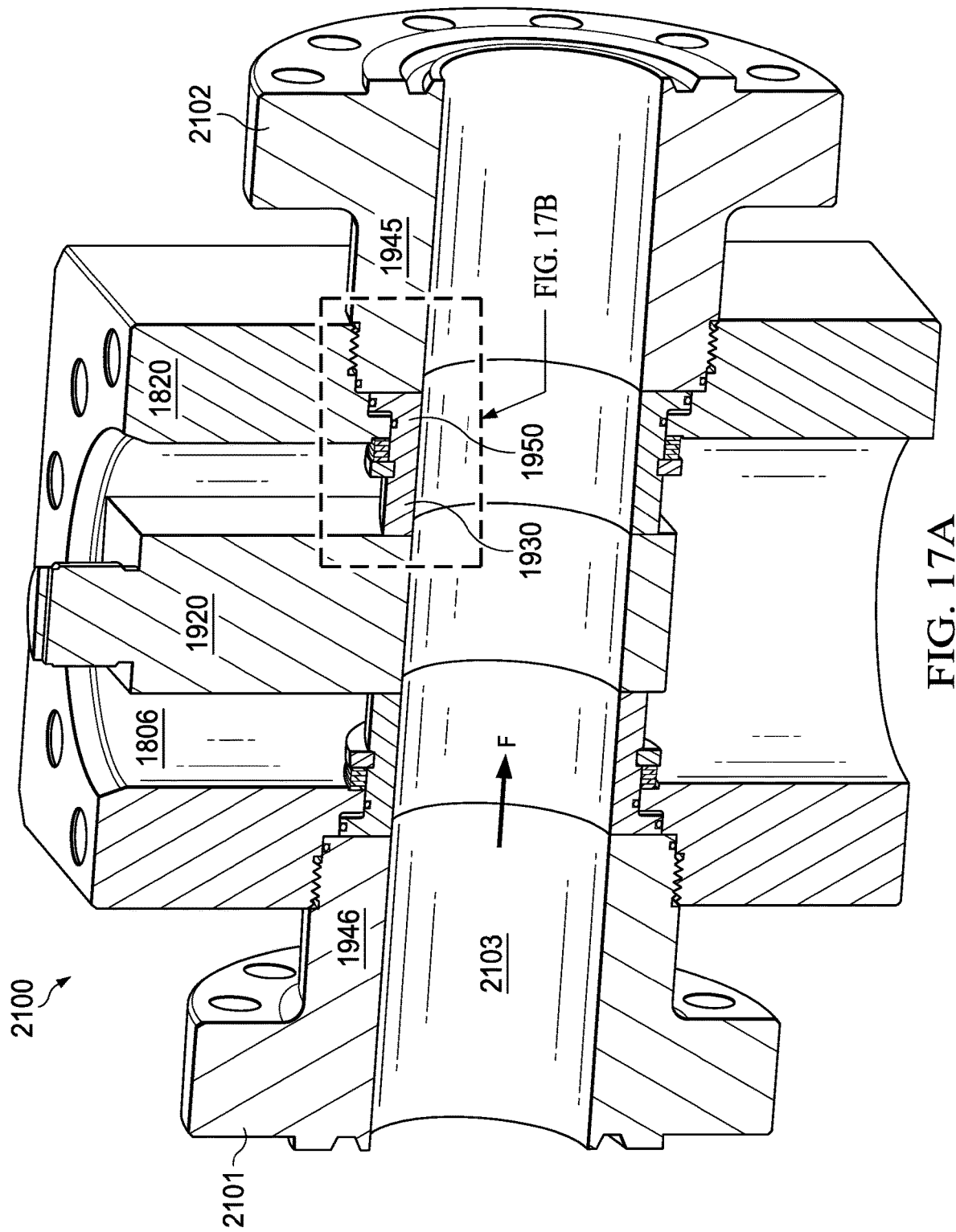
FIG. 17A depicts an alternative embodiment of a gate valve in which a removable bore-end connection is used to maintain the seat in position in relation to the flow barrier and a biasing member disposed between the valve body and a support attached to the seat is used to aid in sealing between the seat and the flow barrier under low-pressure operating conditions.

Referring to FIG. 17A, an alternative embodiment is shown in which valve 2100 comprises a removable bore-end connection to maintain the seat in position in relation to the flow barrier. Similar to the other embodiments described above, extending between upstream flanged connection 2101 and downstream flanged connection 2102 is interior bore 2103. Upstream flanged connection 2101 comprises a portion of removable bore-end connection 1946. Similarly, downstream flanged connection 2102 comprises a portion of removable bore-end connection 1945. Removable bore-end connections 1945 and 1946 connect to valve body 1820 as described in further detail below.

Within valve body 1820 is disposed gate 1920, and seat 1930. Seat 1930 is generally annular in shape and located within recess 1950 formed in the valve body. Seat 1930 may be formed of metal, such as stainless steel. Cavity 1806 is formed within valve body 1820 and gate 1920 moves within cavity 1806. Fluid may flow through interior bore 2103 in the direction indicated by arrow F but, as noted above, fluid may also flow in the opposite direction and the valve will still function as described below.

Figure 17B:
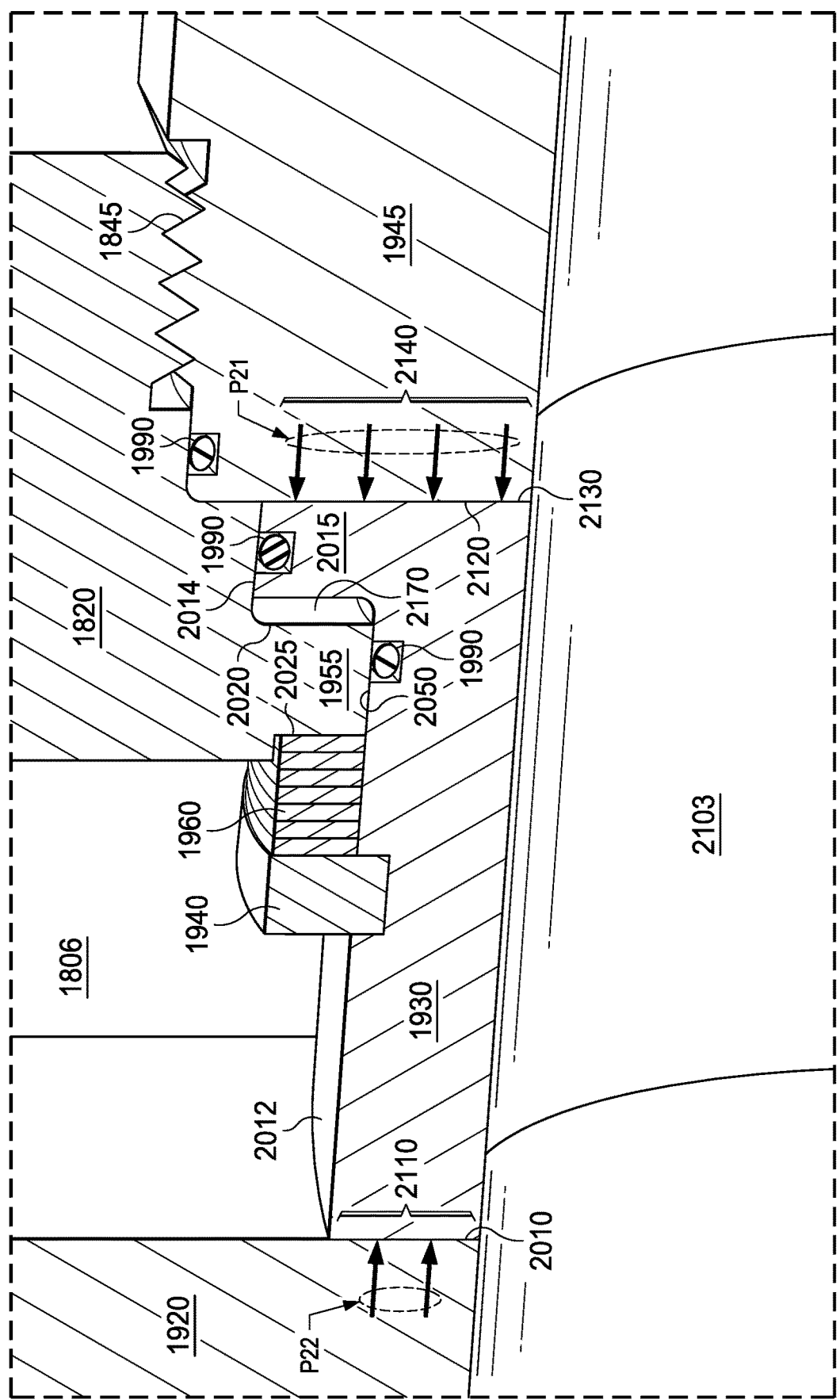
FIG. 17B depicts a close-up view of the seat and removable bore-end connection shown in FIG. 17A.

Referring to FIG. 17B, the downstream side of seat 1930 comprises surface 2120. Surface 2120 is adjacent to removable bore-end connection 1945 at interface 2140. The upstream side of seat 1930 comprises surface 2010. Surface 2010 is adjacent to gate 1920 at interface 2110. As shown, seat 1930 may have a generally "L-shaped" configuration, such that surface 2120 is larger than surface 2010. In addition, there is a radially projecting shoulder 2015 formed in the intermediate portion of seat 1930. Thus, the outer surface of seat 1930 comprises two distinct portions, surface 2012 on the upstream side and surface 2014 on the downstream side.

Recess 1950 is formed such that valve body 1820 comprises radially projecting shoulder 1955. The downstream side of radially projecting shoulder 1955 comprises surface 2020, while the upstream side comprises surface 2025. Radially projecting shoulder 2015 of seat 1930 does not contact any portion of surface 2020. Instead, there is a chamber 2170 formed by portions of surface 2020, valve body 1820, surface 2012, and radially projecting shoulder 2015. Chamber 2170 will generally enclose an area of relatively low pressure, compared to other portions of valve 2100.

Radially projecting shoulder 1955 comprises bottom surface 2050, which contacts surface 2012. Valve body 1820 and seat 1930 make contact with each other at the interface formed between surface 2050 and surface 2012.

Removable bore-end connection 1945 may be connected to valve body 1820 using threaded connection 1845. Any suitable form of threaded connection may be used to connect the removable bore-end connection and the valve body. Alternatively, any other form of removable connection may be used to attach removable bore-end connection 1945 to valve body 1820, including, for example, locking dogs, pins, lugs, a rotating collar, magnets, or a snap-fit connection.

In operation, when valve 2100 is in the open position, the fluid within the interior bore 2103 and cavity 1806 will generally be at the same pressure. The fluid will generally exert pressure P21 on surface 2120 of seat 1930 at interface 2140. This pressure will be exerted in an axial direction, as shown by the arrows in FIG. 17B.

Pressure P22 will also be exerted in the opposite axial direction on surface 2010 of seat 1930 at interface 2110. Due to the difference in surface area between surface 2120 and surface 2010, the total force (pressure times surface area) exerted by pressure P21 is greater than the total force exerted by pressure P22. This differential in force tends to urge seat 1930 into sealing engagement with gate 1920 at interface 2110.

In addition, although pressure within cavity 1806 is exerted on the upstream side of valve body 1820, it does not interfere with the sealing engagement of seat 1930 because the combination of radially projecting shoulder 1955 and chamber 2170 prevents surface 2020 of valve body 1820 from coming into contact with seat 1930. Accordingly, the differential in force resulting from pressure P21 as compared to P22 is sufficient to ensure a robust metal-to-metal seal at interface 2110. In addition, as noted above, as the pressure within interior bore 2103 increases, the difference in force exerted by P21 and P22 will also increase and so the performance of the seal, and thus the valve, will improve as the interior pressure increases. The foregoing description of the operation of valve 2100 in the open position applies equally to the upstream and downstream side of gate 1920.

Additional seals 1990 may be disposed at the interfaces between surface 2050 of radially projecting shoulder 1955 of valve body 1820 and surface 2012 of seat 1930, the interface between surface 2014 of seat 1930 and valve body 1820, and/or the interface between the top surface of removable bore-end connection 1945 and valve body 1820. Such seals may be elastomeric such as, for example, o-rings.

When valve 2100 is in the closed position, a seal is maintained on the downstream side of gate 1920 similar to the mechanism described above in connection with the various other embodiments.

Optionally, valve 2100 may comprise support 1940 attached to seat 1930 and extending in a generally radial direction, with biasing member 1960 extending axially between support 1940 and valve body 1820. Biasing member 1960 may be a spring, a Belleville washer, or any other suitable device that is biased to exert axial pressure on support 1940 in the direction of gate 1920. Support 1940 may be a post, arm, spoke, or any radially extending structure configured to transmit the axial force exerted by biasing member 1960. As a result of the attachment between seat 1930 and support 1940, the axial force exerted by biasing member 1960 assists in maintaining a seal between seat 1930 and gate 1920, particularly under low-pressure operating conditions.

Figure 18A:
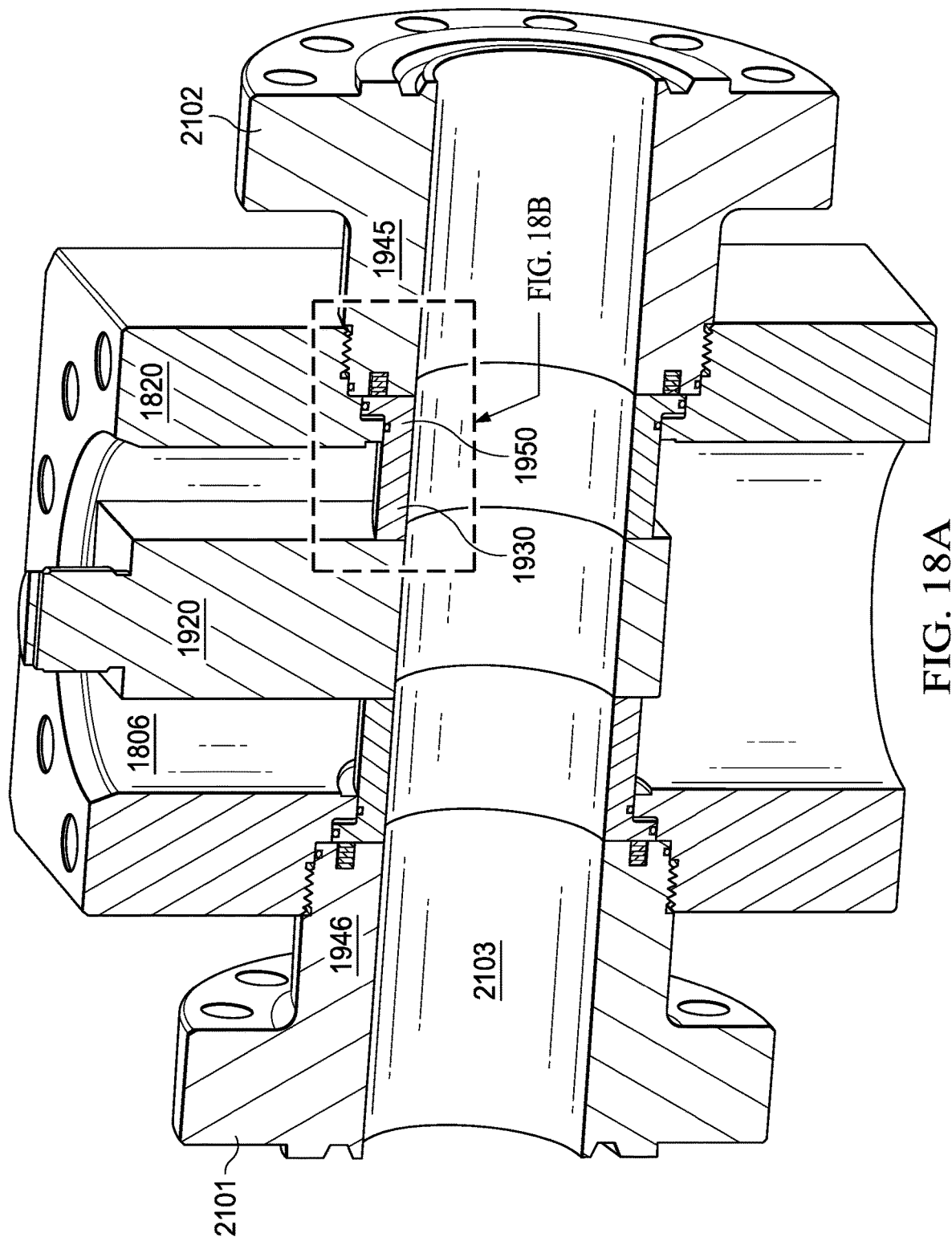
FIG. 18A depicts an alternative embodiment of a gate valve in which a removable bore-end connection is used to maintain the seat in position in relation to the flow barrier and a biasing member disposed between the removable bore-end connection and the downstream surface of the seat is used to aid in sealing between the seat and the flow barrier under low-pressure operating conditions.
Figure 18B:
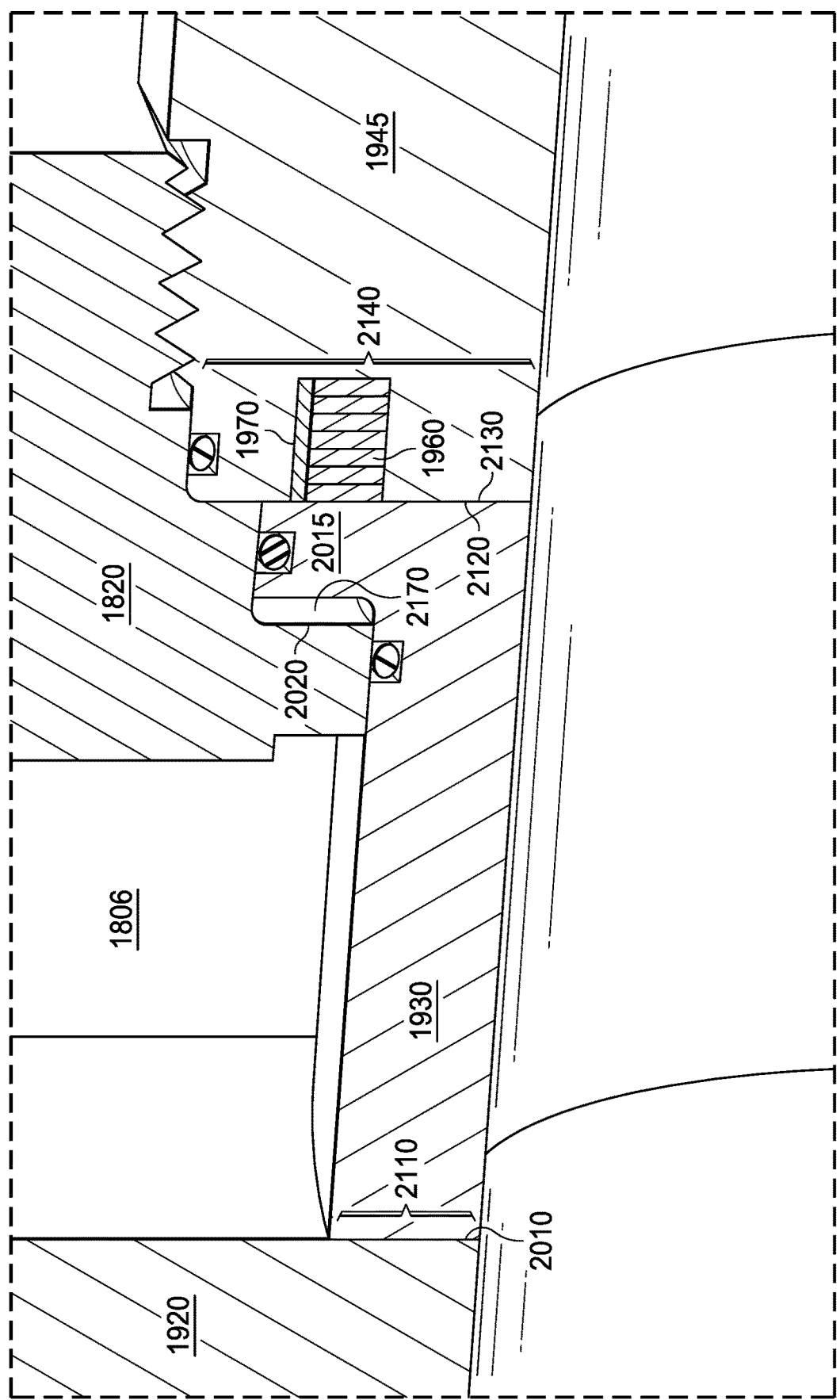
FIG. 18B depicts a close-up view of the seat and removable bore-end connection shown in FIG. 18A.

As shown in FIG. 18B, biasing member 1960 may instead be located within a cavity 1970 formed within removable bore-end connection 1945. In this configuration, biasing member 1960 exerts an axial force on surface 2120 of seat 1930. This axial force tends to urge seat 1930 in the direction of gate 1920, which assists in maintaining a seal, particularly under low-pressure operating conditions.

Figure 19A:
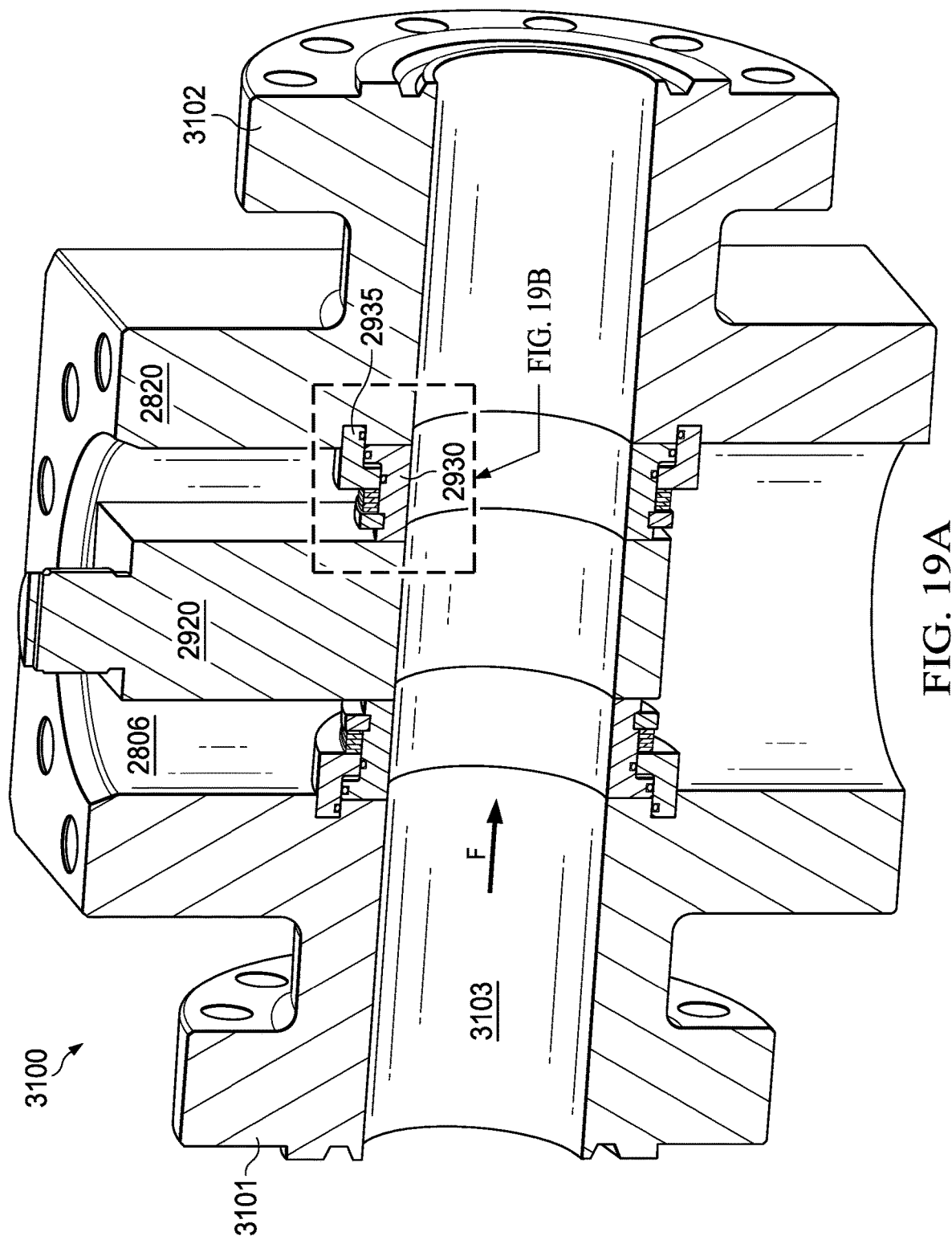
FIG. 19A depicts an alternative embodiment of a gate valve in which a seat and seat bushing are partially disposed within a recess formed in the valve body and a biasing member is disposed between the seat bushing and a support attached to the seat to aid in sealing between the seat and the flow barrier under low-pressure operating conditions.

Referring to FIG. 19A, an alternative embodiment is shown in which valve 3100 comprises a seat bushing partially disposed within a cavity formed in the valve body. Similar to the other embodiments described above, extending between upstream flanged connection 3101 and downstream flanged connection 3102 is interior bore 3103.

Within valve body 2820 is disposed gate 2920, and seat 2930. Seat 2930 is generally annular in shape and located within cavity 2806 formed within valve body 2820. In one embodiment, as shown in FIG. 19A, a portion of seat 2930 may optionally be disposed within a recess formed in valve body 2820. Gate 2920 also moves within cavity 2806. Seat 2930 may be formed of metal, such as stainless steel. Fluid may flow through interior bore 3103 in the direction indicated by arrow F but, as noted above, fluid may also flow in the opposite direction and the valve will still function as described below.

Figure 19B:
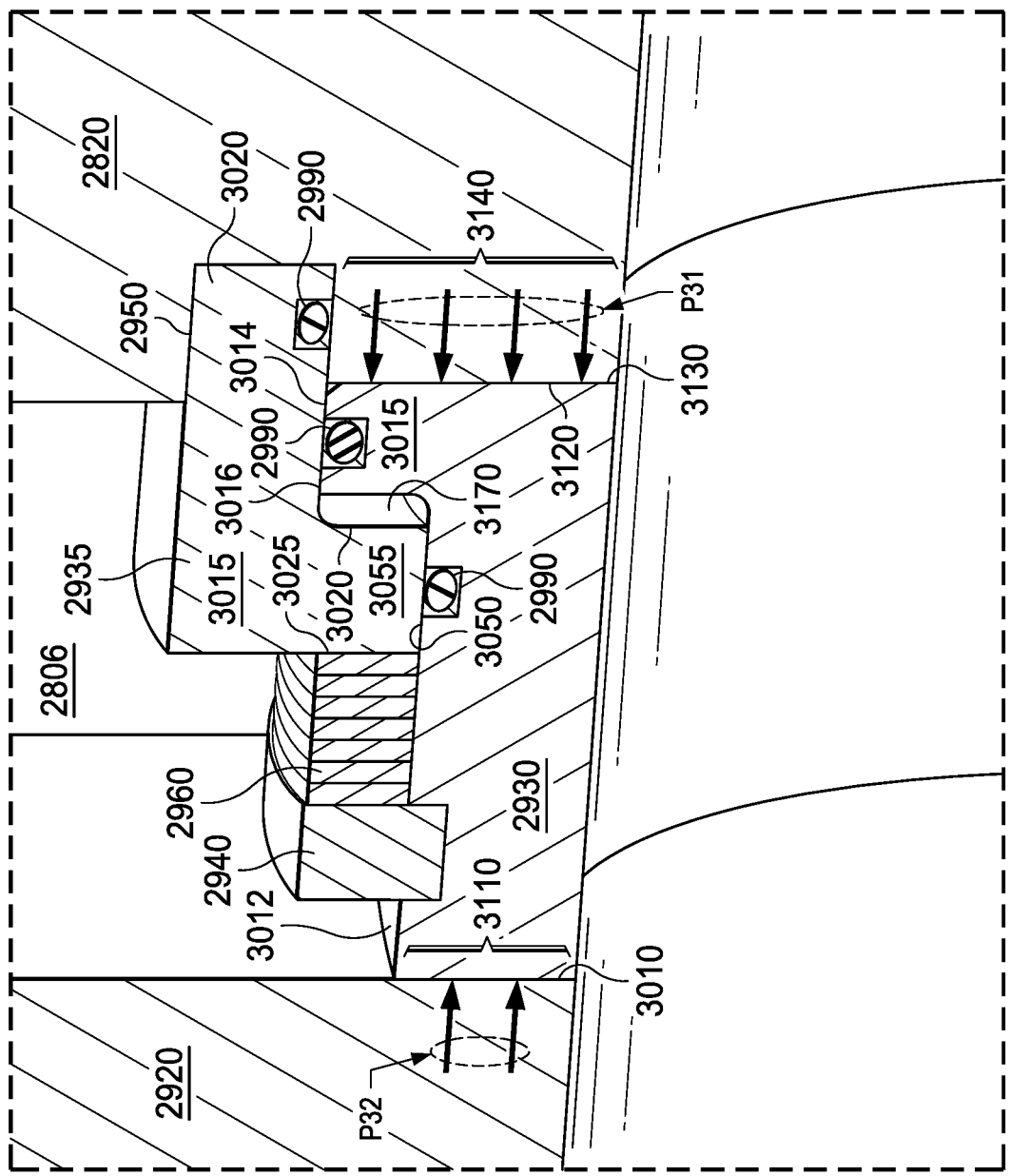
FIG. 19B depicts a close-up view of the seat and seat bushing of the embodiment shown in FIG. 19A.

Referring to FIG. 19B, the downstream side of seat 2930 comprises surface 3120. Surface 3120 is adjacent to valve body 2820 at interface 3140. Interface 3140 may optionally be located within a recess formed in valve body 2820, as shown in FIG. 19A. The upstream side of seat 2930 comprises surface 3010. Surface 3010 is adjacent to gate 2920 at interface 3110. As shown, seat 2930 may have a generally "L-shaped" configuration, such that surface 3120 is larger than surface 3010. In addition, there is a radially projecting shoulder 3015 formed towards the downstream portion of seat 2930. Thus, the outer surface of seat 2930 comprises two distinct portions, surface 3012 on the upstream side and surface 3014 on the downstream side.

Valve 3100 also includes seat bushing 2935, which comprises upstream portion 3015 and downstream portion 3020. Upstream portion 3015, which comprises radially projecting shoulder 3055 and surface 3016, is disposed within cavity 2806. Downstream portion 3020 is disposed within cavity 2950 formed in valve body 2820.

The downstream side of radially projecting shoulder 3055 comprises surface 3020, while the upstream side comprises surface 3025. Radially projecting shoulder 3015 of seat 2930 does not contact any portion of surface 3020. Instead, there is a chamber 3170 formed by portions of surface 3020, surface 3016, surface 3012, and radially projecting shoulder 3015. Chamber 3170 will generally enclose an area of relatively low pressure, compared to other portions of valve 3100.

Radially projecting shoulder 3055 of seat bushing 2935 comprises bottom surface 3050, which contacts surface 3012. Seat bushing 2935 and seat 2930 make contact with each other at the interface formed between surface 3050 and surface 3012.

In operation, when valve 3100 is in the open position, the fluid within the interior bore 3103 and cavity 2806 will generally be at the same pressure. The fluid will generally exert pressure P31 on surface 3120 of seat 2930 at interface 3140. This pressure will be exerted in an axial direction, as shown by the arrows in FIG. 19B.

Pressure P32 will also be exerted in the opposite axial direction on surface 3010 of seat 2930 at interface 3110. Due to the difference in surface area between surface 3120 and surface 3010, the total force (pressure times surface area) exerted by pressure P31 is greater than the total force exerted by pressure P32. This differential in force tends to urge seat 2930 into sealing engagement with gate 2920 at interface 3110.

In addition, although pressure within cavity 2806 is exerted on the upstream portion 3015 of seat bushing 2935, it does not interfere with the sealing engagement of seat 2930 because the combination of radially projecting shoulder 3055 and chamber 3170 prevents surface 3020 of seat bushing 2935 from coming into contact with seat 2930. Accordingly, the differential in force resulting from pressure P31 as compared to P32 is sufficient to ensure a robust metal-to-metal seal at interface 3110. In addition, as noted above, as the pressure within interior bore 3103 increases, the difference in force exerted by P31 and P32 will also increase and so the performance of the seal, and thus the valve, will improve as the interior pressure increases. The foregoing description of the operation of valve 3100 in the open position applies equally to the upstream and downstream side of gate 2920.

Additional seals 2990 may be disposed at the interfaces between surface 3050 of radially projecting shoulder 3055 of seat bushing 2935 and surface 3012 of seat 2930, the interface between surface 3014 of seat 2930 and surface 3016 of the upstream portion 3015 of seat bushing 2935, and/or the interface between the lower surface of the downstream portion 3020 of seat bushing 2935 and valve body 2820. Such seals may be elastomeric such as, for example, o-rings.

When valve 3100 is in the closed position, a seal is maintained on the downstream side of gate 2920 similar to the mechanism described above in connection with the various other embodiments.

Optionally, valve 3100 may comprise support 2940 attached to seat 2930 and extending in a generally radial direction, with biasing member 2960 extending axially between support 2940 and seat bushing 2935. Biasing member 2960 may be a spring, a Belleville washer, or any other suitable device that is biased to exert axial pressure on support 2940 in the direction of gate 2920. Support 2940 may be a post, arm, spoke, or any radially extending structure configured to transmit the axial force exerted by biasing member 2960. As a result of the attachment between seat 2930 and support 2940, the axial force exerted by biasing member 2960 assists in maintaining a seal between seat 2930 and gate 2920, particularly under low-pressure operating conditions.

Figure 20B:
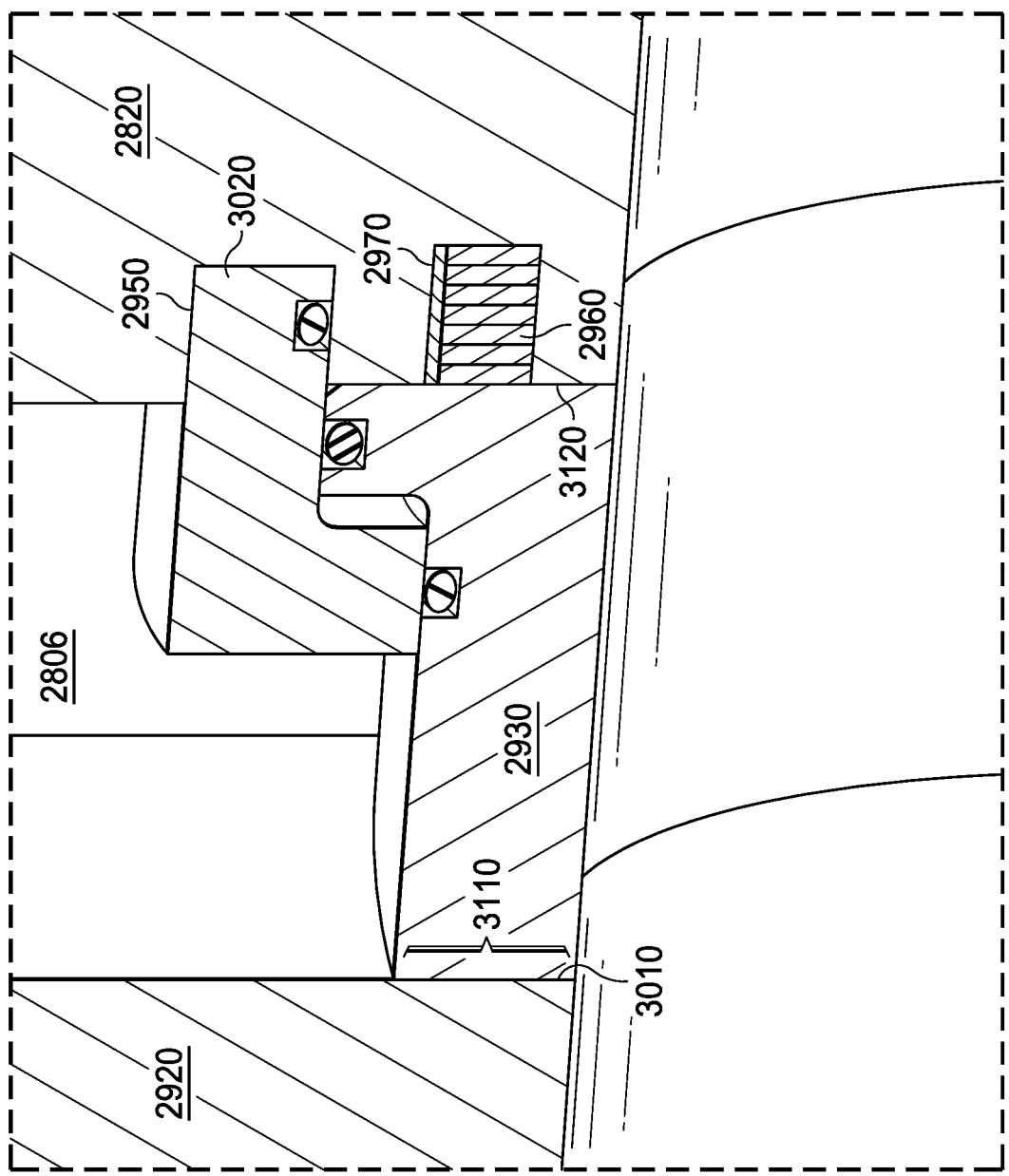
FIG. 20B depicts a close-up view of the seat and seat bushing of the embodiment shown in FIG. 20A.

As shown in FIG. 20B, biasing member 2960 may instead be located within a cavity 2970 formed within valve body 2820. In this configuration, biasing member 2960 exerts an axial force on surface 3120 of seat 2930. This axial force tends to urge seat 2930 in the direction of gate 2920, which assists in maintaining a seal, particularly under low-pressure operating conditions.

It is understood that variations may be made in the foregoing without departing from the scope of the present disclosure. In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes, and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. A valve comprising:
    a valve body comprising a cavity, an interior bore with a central longitudinal axis, and a radially projecting shoulder;
    a flow barrier disposed within said cavity and operable to move between an open position in which the interior bore of the valve body is unobstructed and a closed position in which the flow barrier obstructs the interior bore;
    a removable bore-end connection connected to the valve body;
    a seat comprising a first axial surface adjacent to said interior bore, a first radial surface adjacent to said flow barrier and a second radial surface, the second radial surface being larger than the first radial surface, said seat disposed between the flow barrier and the removable bore-end connection, such that it does not contact the radially projecting shoulder of the valve body.

2. The valve of claim 1 further comprising a support member attached to the seat and a biasing member disposed between the support member and the valve body.

3. The valve of claim 1, further comprising one or more elastomeric sealing elements disposed within a groove formed in an upper surface of the seat.

4. The valve of claim 3, further comprising one or more elastomeric sealing elements disposed within a groove formed in an upper surface of the removable bore-end connection.

5. The valve of claim 1 in which the flow barrier comprises a plug.

6. The valve of claim 1 in which the flow barrier comprises a gate.

7. The valve of claim 1 in which the seat is comprised of metal, such that contact between the first radial surface and the flow barrier creates a metal-to-metal seal.

8. The valve of claim 1, further comprising a biasing member disposed between the removable bore-end connection and the seat and configured to exert an axial force on the seat in the direction of the flow barrier.

9. The valve of claim 1, wherein the connection between the removable bore-end connection and the valve body is threaded.

* * * * *